United States Patent
Zhang et al.

(10) Patent No.: US 10,380,552 B2
(45) Date of Patent: Aug. 13, 2019

(54) APPLICANT SKILLS INFERENCE FOR A JOB

(71) Applicant: Microsoft Technology Licensing, LLC, Redmond, WA (US)

(72) Inventors: Siyuan Zhang, Mountain View, CA (US); Mohsen Jamali, Sunnyvale, CA (US); Qin Iris Wang, Cupertino, CA (US); Hamed Firooz, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 250 days.

(21) Appl. No.: 15/404,846

(22) Filed: Jan. 12, 2017

(65) Prior Publication Data
US 2018/0121879 A1    May 3, 2018

Related U.S. Application Data

(60) Provisional application No. 62/415,323, filed on Oct. 31, 2016.

(51) Int. Cl.
*G06Q 10/00* (2012.01)
*G06Q 10/10* (2012.01)
(Continued)

(52) U.S. Cl.
CPC ..... *G06Q 10/1053* (2013.01); *G06F 16/3344* (2019.01); *G06Q 10/063112* (2013.01); *G06Q 50/01* (2013.01)

(58) Field of Classification Search
CPC .............. G06Q 10/1053; G06Q 50/01; G06Q 10/063112
(Continued)

(56) References Cited

U.S. PATENT DOCUMENTS

| 6,078,935 A | 6/2000 | Nielsen |
| 6,289,340 B1 | 9/2001 | Puram et al. |

(Continued)

FOREIGN PATENT DOCUMENTS

| CN | 103502975 A | 1/2014 |
| DE | 212013000002 U1 | 9/2013 |

(Continued)

OTHER PUBLICATIONS

"U.S. Appl. No. 13/357,171, Non Final Office Action dated Jun. 17, 2013", 9 pgs.

(Continued)

*Primary Examiner* — Gabrielle A McCormick
(74) *Attorney, Agent, or Firm* — Schwegman Lundberg & Woessner, P.A.

(57) ABSTRACT

Techniques for inferring a specific skill associated with a job posting are described. In an example, disclosed is a system that selects, from a jobs database, a specific job posting from a plurality of job postings. Additionally, job applicants for the specific job posting can be determined using indicators in the profile data of members. Moreover, a set of skills associated with the job applicants can be obtained. Furthermore, a percentage of the job applicants having a specific skill from the set of skills can be determined using the profile data of the job applicants. Subsequently, a confidence score of the specific skill being associated with the specific job posting can be calculated based on the percentage of the job applicants having the specific skill. A user interface can display a presentation of the specific job posting to a first member when the confidence score transgresses a predetermined score.

19 Claims, 7 Drawing Sheets

(51) Int. Cl.
    *G06Q 50/00*     (2012.01)
    *G06F 16/33*     (2019.01)
    *G06Q 10/06*     (2012.01)

(58) Field of Classification Search
    USPC ........................................ 705/319, 320, 321
    See application file for complete search history.

(56) References Cited

U.S. PATENT DOCUMENTS

| | | | |
|---|---|---|---|
| 6,594,673 | B1 | 7/2003 | Smith et al. |
| 6,675,159 | B1 | 1/2004 | Lin et al. |
| 7,310,676 | B2 | 12/2007 | Bourne |
| 7,478,078 | B2 | 1/2009 | Lunt et al. |
| 7,539,697 | B1 | 5/2009 | Akella |
| 7,593,740 | B2 | 9/2009 | Crowley et al. |
| 7,945,522 | B2 | 5/2011 | Mcgovern et al. |
| 7,945,862 | B2 | 5/2011 | Aldrich et al. |
| 8,036,931 | B2 | 10/2011 | Hale et al. |
| 8,060,451 | B2 | 11/2011 | Degeratu et al. |
| 8,224,756 | B2 | 7/2012 | Roberts et al. |
| 8,398,490 | B1 | 3/2013 | Phelon et al. |
| 8,402,040 | B2 | 3/2013 | Mallalieu et al. |
| 8,412,564 | B1 | 4/2013 | Thell et al. |
| 8,494,914 | B2 | 7/2013 | Mesaros |
| 8,650,177 | B2 | 2/2014 | Skomoroch et al. |
| 8,661,034 | B2 | 2/2014 | Polonsky et al. |
| 8,825,785 | B1 | 9/2014 | Shah et al. |
| 8,935,263 | B1 | 1/2015 | Rodriguez et al. |
| 9,087,321 | B2 | 7/2015 | Neal et al. |
| 9,135,573 | B1 | 9/2015 | Rodriguez et al. |
| 9,137,323 | B2 | 9/2015 | Shah et al. |
| 9,225,788 | B2 | 12/2015 | Naveh et al. |
| 9,251,470 | B2 | 2/2016 | Hua et al. |
| 9,342,592 | B2 | 5/2016 | Giverts et al. |
| 9,536,439 | B1 | 1/2017 | Goldstein et al. |
| 9,654,592 | B2 | 5/2017 | Jayaram et al. |
| 9,697,472 | B2 | 7/2017 | Burgess et al. |
| 9,886,498 | B2 | 2/2018 | Goel et al. |
| 2001/0032244 | A1 | 10/2001 | Neustel |
| 2002/0181685 | A1 | 12/2002 | Doherty et al. |
| 2003/0128236 | A1 | 7/2003 | Chen |
| 2003/0187809 | A1 | 10/2003 | Suermondt et al. |
| 2003/0187813 | A1 | 10/2003 | Goldman et al. |
| 2003/0220811 | A1 | 11/2003 | Fan et al. |
| 2004/0010443 | A1 | 1/2004 | May et al. |
| 2005/0015432 | A1 | 1/2005 | Cohen |
| 2005/0055450 | A1 | 3/2005 | Gang |
| 2005/0096973 | A1 | 5/2005 | Heyse et al. |
| 2005/0130110 | A1 | 6/2005 | Gosling |
| 2005/0278325 | A1 | 12/2005 | Mihalcea et al. |
| 2006/0004716 | A1 | 1/2006 | Hurst-Hiller et al. |
| 2006/0042483 | A1 | 3/2006 | Work et al. |
| 2006/0136419 | A1 | 6/2006 | Brydon et al. |
| 2006/0184409 | A1 | 8/2006 | Bangel et al. |
| 2006/0184464 | A1 | 8/2006 | Tseng et al. |
| 2006/0218111 | A1 | 9/2006 | Cohen |
| 2006/0242014 | A1 | 10/2006 | Marshall et al. |
| 2006/0287970 | A1 | 12/2006 | Chess et al. |
| 2007/0059671 | A1 | 3/2007 | Mitchell |
| 2007/0067441 | A1 | 3/2007 | Pomerantz |
| 2007/0190504 | A1 | 8/2007 | Schwartz et al. |
| 2007/0202475 | A1 | 8/2007 | Habichler et al. |
| 2007/0203710 | A1 | 8/2007 | Habichler et al. |
| 2008/0005072 | A1 | 1/2008 | Meek et al. |
| 2008/0052358 | A1 | 2/2008 | Beaven et al. |
| 2008/0065481 | A1 | 3/2008 | Immorlica et al. |
| 2008/0077461 | A1 | 3/2008 | Glick |
| 2008/0140680 | A1 | 6/2008 | Hyder et al. |
| 2008/0172415 | A1 | 7/2008 | Fakhari et al. |
| 2008/0228708 | A1 | 9/2008 | Kenedy et al. |
| 2008/0243628 | A1 | 10/2008 | Wiseman et al. |
| 2008/0313000 | A1 | 12/2008 | Degeratu et al. |
| 2009/0006193 | A1 | 1/2009 | Forbes et al. |
| 2009/0027392 | A1 | 1/2009 | Jadhav et al. |
| 2009/0112796 | A1 | 4/2009 | Elder |
| 2009/0222303 | A1 | 9/2009 | Higgins et al. |
| 2009/0228425 | A1 | 9/2009 | Goraya |
| 2009/0276231 | A1 | 11/2009 | Bazigos et al. |
| 2009/0276295 | A1 | 11/2009 | Dane |
| 2009/0299990 | A1 | 12/2009 | Setlur et al. |
| 2010/0036934 | A1 | 2/2010 | Bruster |
| 2010/0057597 | A1 | 3/2010 | Vilrokx |
| 2010/0057659 | A1 | 3/2010 | Phelon et al. |
| 2010/0082427 | A1 | 4/2010 | Burgener et al. |
| 2010/0094879 | A1 | 4/2010 | Donnelly et al. |
| 2010/0153288 | A1 | 6/2010 | Digiambattista et al. |
| 2010/0161369 | A1 | 6/2010 | Farrell et al. |
| 2010/0312713 | A1 | 12/2010 | Keltner |
| 2011/0040586 | A1 | 2/2011 | Murray et al. |
| 2011/0040753 | A1 | 2/2011 | Knight |
| 2011/0078188 | A1 | 3/2011 | Li et al. |
| 2011/0145747 | A1 | 6/2011 | Wong et al. |
| 2011/0161129 | A1 | 6/2011 | Barsoba et al. |
| 2011/0177483 | A1 | 7/2011 | Needham et al. |
| 2011/0185020 | A1 | 7/2011 | Ramamurthy et al. |
| 2011/0196924 | A1 | 8/2011 | Hargarten et al. |
| 2011/0238591 | A1 | 9/2011 | Kerr et al. |
| 2011/0258042 | A1 | 10/2011 | Purvy et al. |
| 2011/0276582 | A1 | 11/2011 | Schmitt |
| 2011/0288851 | A1 | 11/2011 | Duan |
| 2012/0022949 | A1 | 1/2012 | George |
| 2012/0023030 | A1 | 1/2012 | Jeffries |
| 2012/0095933 | A1 | 4/2012 | Goldberg |
| 2012/0110071 | A1 | 5/2012 | Zhou et al. |
| 2012/0117036 | A1 | 5/2012 | Lester et al. |
| 2012/0143921 | A1 | 6/2012 | Wilson et al. |
| 2012/0166535 | A1 | 6/2012 | Deng et al. |
| 2012/0185486 | A1 | 7/2012 | Voigt et al. |
| 2012/0197863 | A1 | 8/2012 | Skomoroch et al. |
| 2012/0197906 | A1 | 8/2012 | Landau et al. |
| 2012/0197993 | A1 | 8/2012 | Skomoroch et al. |
| 2012/0226623 | A1 | 9/2012 | Jurney et al. |
| 2012/0259791 | A1 | 10/2012 | Zoidze |
| 2012/0311462 | A1 | 12/2012 | Devecka |
| 2013/0006765 | A1 | 1/2013 | Lee |
| 2013/0013489 | A1 | 1/2013 | Kremen et al. |
| 2013/0013526 | A1 | 1/2013 | Le Viet et al. |
| 2013/0018871 | A1 | 1/2013 | Mehta et al. |
| 2013/0018900 | A1 | 1/2013 | Cheng |
| 2013/0031090 | A1 | 1/2013 | Posse et al. |
| 2013/0060685 | A1 | 3/2013 | Om |
| 2013/0091071 | A1 | 4/2013 | Davies |
| 2013/0124268 | A1 | 5/2013 | Hatton et al. |
| 2013/0159325 | A1 | 6/2013 | Polonsky et al. |
| 2013/0166466 | A1 | 6/2013 | Sanger |
| 2013/0212031 | A1 | 8/2013 | Barnfield et al. |
| 2013/0212032 | A1 | 8/2013 | Cox et al. |
| 2013/0218965 | A1 | 8/2013 | Abrol et al. |
| 2013/0232171 | A1 | 9/2013 | Cheng et al. |
| 2013/0254213 | A1 | 9/2013 | Cheng et al. |
| 2013/0254303 | A1 | 9/2013 | Cheng et al. |
| 2013/0254305 | A1 | 9/2013 | Cheng et al. |
| 2013/0268373 | A1 | 10/2013 | Grishaver |
| 2013/0282811 | A1 | 10/2013 | Lessin et al. |
| 2013/0297543 | A1 | 11/2013 | Treiser |
| 2014/0025427 | A1 | 1/2014 | Bastian et al. |
| 2014/0052656 | A1 | 2/2014 | Ball |
| 2014/0081928 | A1 | 3/2014 | Skomoroch et al. |
| 2014/0081995 | A1 | 3/2014 | Martin et al. |
| 2014/0122472 | A1 | 5/2014 | Wells |
| 2014/0129631 | A1 | 5/2014 | Jayaram et al. |
| 2014/0136433 | A1 | 5/2014 | Posse et al. |
| 2014/0136434 | A1 | 5/2014 | Posse et al. |
| 2014/0143163 | A1 | 5/2014 | Kamat et al. |
| 2014/0143165 | A1 | 5/2014 | Posse et al. |
| 2014/0143167 | A1 | 5/2014 | Cheng et al. |
| 2014/0143324 | A1 | 5/2014 | Lessin |
| 2014/0164416 | A1 | 6/2014 | Hosseini et al. |
| 2014/0164952 | A1 | 6/2014 | Allen et al. |
| 2014/0180943 | A1 | 6/2014 | Priddy, Jr. et al. |
| 2014/0181193 | A1 | 6/2014 | Narasimhan et al. |
| 2014/0195549 | A1 | 7/2014 | Ahn et al. |
| 2014/0244561 | A1 | 8/2014 | Cheng et al. |
| 2014/0245184 | A1 | 8/2014 | Cheng et al. |

(56) References Cited

U.S. PATENT DOCUMENTS

| | | | |
|---|---|---|---|
| 2014/0279722 A1 | 9/2014 | Singh et al. | |
| 2014/0297746 A1 | 10/2014 | Cheng et al. | |
| 2014/0358607 A1 | 12/2014 | Gupta et al. | |
| 2014/0379602 A1* | 12/2014 | Nelson | G06Q 10/00 705/327 |
| 2015/0032747 A1 | 1/2015 | Giverts et al. | |
| 2015/0088793 A1 | 3/2015 | Burgess et al. | |
| 2015/0127565 A1 | 5/2015 | Chevalier et al. | |
| 2015/0127567 A1 | 5/2015 | Menon et al. | |
| 2015/0317759 A1 | 11/2015 | Jing et al. | |
| 2015/0317760 A1 | 11/2015 | Pham | |
| 2015/0347917 A1 | 12/2015 | Hua et al. | |
| 2016/0092838 A1 | 3/2016 | Hardtke et al. | |
| 2016/0092998 A1 | 3/2016 | Goel | |
| 2016/0098644 A1 | 4/2016 | Hua et al. | |
| 2016/0117385 A1 | 4/2016 | Goel et al. | |
| 2016/0196266 A1 | 7/2016 | Merhav et al. | |
| 2016/0379170 A1 | 12/2016 | Pande | |
| 2017/0161668 A1 | 6/2017 | Jayaram et al. | |
| 2017/0177580 A1 | 6/2017 | Markman et al. | |
| 2017/0220955 A1 | 8/2017 | Burgess et al. | |
| 2018/0121880 A1 | 5/2018 | Zhang et al. | |

FOREIGN PATENT DOCUMENTS

| | | |
|---|---|---|
| WO | WO-2013131108 A1 | 9/2013 |
| WO | WO-2015183376 A1 | 12/2015 |

OTHER PUBLICATIONS

"U.S. Appl. No. 13/357,171, Notice of Allowance dated Oct. 1, 2013", 10 pgs.

"U.S. Appl. No. 13/357,171, Response filed Sep. 17, 2013 to Non Final Office Action dated Jun. 17, 2013", 12 pgs.

"U.S. Appl. No. 13/357,302, Examiner Interview Summary dated Mar. 17, 2016", 3 pgs.

"U.S. Appl. No. 13/357,302, Final Office Action dated May 3, 2017", 45 pgs.

"U.S. Appl. No. 13/357,302, Final Office Action dated Nov. 9, 2015", 44 pgs.

"U.S. Appl. No. 13/357,302, Non Final Office Action dated Mar. 4, 2015", 28 pgs.

"U.S. Appl. No. 13/357,302, Non Final Office Action dated Sep. 7, 2016", 46 pgs.

"U.S. Appl. No. 13/357,302, Response filed Feb. 7, 2017 to Non Final Office Action dated Sep. 7, 2016", 17 pgs.

"U.S. Appl. No. 13/357,302, Response filed Mar. 9, 2016 to Final Office Action dated Nov. 9, 2015", 16 pgs.

"U.S. Appl. No. 13/357,302, Response filed Aug. 4, 2015 to Non Final Office Action dated Mar. 4, 2015", 25 pgs.

"U.S. Appl. No. 13/357,360, Advisory Action dated Apr. 13, 2017", 3 pgs.

"U.S. Appl. No. 13/357,360, Examiner Interview Summary dated Feb. 7, 2018", 3 pgs.

"U.S. Appl. No. 13/357,360, Final Office Action dated Feb. 2, 2017", 30 pgs.

"U.S. Appl. No. 13/357,360, Final Office Action dated Mar. 27, 2018", 14 pgs.

"U.S. Appl. No. 13/357,360, Final Office Action dated Jun. 27, 2013", 22 pgs.

"U.S. Appl. No. 13/357,360, Non Final Office Action dated Jul. 14, 2016", 28 pgs.

"U.S. Appl. No. 13/357,360, Non Final Office Action dated Oct. 6, 2017", 10 pgs.

"U.S. Appl. No. 13/357,360, Non Final Office Action dated Oct. 11, 2012", 13 pgs.

"U.S. Appl. No. 13/357,360, Response filed Feb. 6, 2018 to Non Final Office Action dated Oct. 6, 2017", 15 pgs.

"U.S. Appl. No. 13/357,360, Response filed Mar. 18, 2013 to Non Final Office Action dated Oct. 11, 2012", 17 pgs.

"U.S. Appl. No. 13/357,360, Response filed Apr. 3, 2017 to Final Office Action dated Feb. 2, 2017", 16 pgs.

"U.S. Appl. No. 13/357,360, Response Filed Oct. 14, 2016 to Non Final Office Action dated Jul. 14, 2016", 27 pgs.

"U.S. Appl. No. 13/357,360, Response filed Nov. 20, 2013 to Final Office Action dated Jun. 27, 2013", 18 pgs.

"U.S. Appl. No. 13/482,884, Final Office Action dated Feb. 6, 2014", 19 pgs.

"U.S. Appl. No. 13/482,884, Non Final Office Action dated Jul 15, 2013", 19 pgs.

"U.S. Appl. No. 13/482,884, Non Final Office Action dated Oct. 3, 2012", 19 pgs.

"U.S. Appl. No. 13/482,884, Response filed Jan. 2, 2013 to Non Final Office Action dated Oct. 3, 2012," 11 pgs.

"U.S. Appl. No. 13/482,884, Response filed Oct. 15, 2013 to Non Final Office Action dated Jul. 15, 2013", 11 pgs.

"U.S. Appl. No. 13/672,377, Advisory Action dated Nov. 25, 2016", 4 pgs.

"U.S. Appl. No. 13/672,377, Corrected Notice of Allowance dated Feb. 7, 2017", 2 pgs.

"U.S. Appl. No. 13/672,377, Final Office Action dated Jul. 2, 2015", 8 pgs.

"U.S. Appl. No. 13/672,377, Final Office Action dated Aug. 18, 2016", 12 pgs.

"U.S. Appl. No. 13/672,377, Non Final Office Action dated Feb. 26, 2016", 12 pgs.

"U.S. Appl. No. 13/672,377, Non Final Office Action dated Dec. 4, 2014", 9 pgs.

"U.S. Appl. No. 13/672,377, Notice of Allowance dated Jan. 17, 2017", 6 pgs.

"U.S. Appl. No. 13/672,377, Response filed Apr. 6, 2015 to Non Final Office Action dated Dec. 4, 2014", 13 pgs.

"U.S. Appl. No. 13/672,377, Response filed Jul. 26, 2016 to Non Final Office Action dated Feb. 26, 2016", 11 pgs.

"U.S. Appl. No. 13/672,377, Response filed Oct. 18, 2016 to Final Office Action dated Aug. 18, 2016", 13 pgs.

"U.S. Appl. No. 13/672,377, Response filed Dec. 17, 2015 to Final Office Action dated Jul. 2, 2015", 12 pgs.

"U.S. Appl. No. 13/672,377, Response filed Dec. 19, 2016 to Advisory Action dated Nov. 25, 2016", 14 pgs.

"U.S. Appl. No. 13/780,116, Advisory Action dated Oct. 20, 2015", 4 pgs.

"U.S. Appl. No. 13/780,116, Appeal Decision dated Nov. 2, 2017", 12 pgs.

"U.S. Appl. No. 13/780,116, Examiner Interview Summary dated May 3, 2016", 2 pgs.

"U.S. Appl. No. 13/780,116, Final Office Action dated May 11, 2016", 9 pgs.

"U.S. Appl. No. 13/780,116, Final Office Action dated Jul. 30, 2015", 25 pgs.

"U.S. Appl. No. 13/780,116, Non Final Office Action dated Feb. 26, 2015", 26 pgs.

"U.S. Appl. No. 13/780,116, Non Final Office Action dated Dec. 3, 2015", 13 pgs.

"U.S. Appl. No. 13/780,116, Reply Brief filed Jan. 4, 2017", 3 pgs.

"U.S. Appl. No. 13/780,116, Response filed Apr. 1, 2016 to Non-Final Office Action dated Dec. 3, 2015", 14 pgs.

"U.S. Appl. No. 13/780,116, Response filed Apr. 27, 2015 to Non-Final Office Action dated Feb. 26, 2015", 12 pgs.

"U.S. Appl. No. 13/780,116, Response filed Sep. 30, 2015 to Final Office Action dated Jul. 30, 2015", 13 pgs.

"U.S. Appl. No. 13/780,116, Response filed Oct. 30, 2015 to Advisory Action dated Oct. 20, 2015", 11 pgs.

"U.S. Appl. No. 13/780,198, Advisory Action dated Oct. 21, 2015", 4 pgs.

"U.S. Appl. No. 13/780,198, Appeal Brief dated Aug. 12, 2016", 31 pgs.

"U.S. Appl. No. 13/780,198, Appeal Decision dated Sep. 5, 2017", 11 pgs.

"U.S. Appl. No. 13/780,198, Examiner Interview Summary dated May 5, 2016", 2 pgs.

"U.S. Appl. No. 13/780,198, Final Office Action dated May 12, 2016", 9 pgs.

(56) References Cited

OTHER PUBLICATIONS

"U.S. Appl. No. 13/780,198, Final Office Action dated Jul. 29, 2015", 30 pgs.
"U.S. Appl. No. 13/780,198, Non Final Office Action dated Jan. 15, 2015", 31 pgs.
"U.S. Appl. No. 13/780,198, Non Final Office Action dated Dec. 4, 2015", 13 pgs.
"U.S. Appl. No. 13/780,198, Reply Brief filed Jan. 12, 2017", 3 pgs.
"U.S. Appl. No. 13/780,198, Response filed Apr. 1, 2016 to Non-Final Office Action dated Dec. 4, 2015", 13 pgs.
"U.S. Appl. No. 13/780,198, Response filed Apr. 13, 2015 to Non Final Office Action dated Jan. 15, 2015", 16 pgs.
"U.S. Appl. No. 13/780,198, Response filed Sep. 29, 2015 to Final Office Action dated Jul 29, 2015", 15 pgs.
"U.S. Appl. No. 13/780,198, Response filed Oct. 29, 2015 to Advisory Action dated Oct. 21, 2015", 17 pgs.
"U.S. Appl. No. 14/072,955, Appeal Bried field Sep. 15, 2016", 36 pgs.
"U.S. Appl. No. 14/072,955, Appeal Decision dated Dec. 28, 2017", 6 psg.
"U.S. Appl. No. 14/072,955, Examiner Interview Summary dated Mar. 30, 2015", 3 pgs.
"U.S. Appl. No. 14/072,955, Examiner's Answer dated Feb. 10, 2017", 7 pgs.
"U.S. Appl. No. 14/072,955, Final Office Action dated Jan. 15, 2016", 12 pgs.
"U.S. Appl. No. 14/072,955, Final Office Action dated Mar. 22, 2018", 7 pgs.
"U.S. Appl. No. 14/072,955, Final Office Action dated Nov. 12, 2014", 11 pgs.
"U.S. Appl. No. 14/072,955, Non Final Office Action dated May 9, 2014", 11 pgs.
"U.S. Appl. No. 14/072,955, Non Final Office Action dated May 29, 2015", 12 pgs.
"U.S. Appl. No. 14/072,955, Notice of Non-Compliant Appeal Brief dated Oct. 6, 2016", 2 pgs.
"U.S. Appl. No. 14/072,955, Preliminary Amendment filed Dec. 10, 2013", 10 pgs.
"U.S. Appl. No. 14/072,955, Reply Brief filed Apr. 10, 2017", 9 pgs.
"U.S. Appl. No. 14/072,955, Response filed Apr. 13, 2015 to Final Office Action dated Nov. 12, 2014", 13 pgs.
"U.S. Appl. No. 14/072,955, Response filed Jun. 19, 2018 to Final Office Action dated Mar. 22, 2018", 11 pgs.
"U.S. Appl. No. 14/072,955, Response filed Aug. 11, 2014 to Non Final Office Action dated May 9, 2014", 14 pgs.
"U.S. Appl. No. 14/072,955, Response filed Jan. 12, 2018 to Final Office Action dated Jan. 15, 2016", 11 pgs.
"U.S. Appl. No. 14/072,955, Response filed Oct. 18, 2016 to Notice of Non-Compliant Appeal Brief dated Oct. 6, 2016", 9 pgs.
"U.S. Appl. No. 14/072,955, Response filed Oct. 29, 2015 to Non Final Office Action dated May 29, 2015", 15 pgs.
"U.S. Appl. No. 14/292,779, 312 Amendment filed Nov. 30, 2015", 4 pgs.
"U.S. Appl. No. 14/292,779, Final Office Action dated Jun. 5, 2015", 24 pgs.
"U.S. Appl. No. 14/292,779, Non Final Office Action dated Oct. 29, 2014", 22 pgs.
"U.S. Appl. No. 14/292,779, Notice of Allowance dated Oct. 13, 2015", 18 pgs.
"U.S. Appl. No. 14/292,779, PTO Response to Rule 312 Communication dated Jan. 5, 2016", 2 pgs.
"U.S. Appl. No. 14/292,779, Response filed Jan. 29, 2015 to Non Final Office Action dated Oct. 29, 2014", 12 pgs.
"U.S. Appl. No. 14/292,779, Response filed Sep. 8, 2015 to Final Office Action dated Jun. 5, 2015", 12 pgs.
"U.S. Appl. No. 14/296,258, Non Final Office Action dated Jul. 15, 2016", 10 pgs.
"U.S. Appl. No. 14/296,258, Notice of Allowance dated Mar. 1, 2017", 5 pgs.
"U.S. Appl. No. 14/296.258, Response filed Nov. 15, 2016 to Non Final Office Action dated Jul. 15, 2016", 6 pgs.
"U.S. Appl. No. 14/502,993, Advisory Action dated Apr. 16, 2018", 4 pgs.
"U.S. Appl. No. 14/502,993, Examiner Interview Summary dated Nov. 27, 2017", 3 pgs.
"U.S. Appl. No. 14/502,993, Final Office Action dated Jan. 29, 2018", 26 pgs.
"U.S. Appl. No. 14/502,993, Non Final Office Action dated Sep. 28, 2017", 21 pgs.
"U.S. Appl. No. 14/502,993, Response filed Mar. 29, 2018 to Final Office Action dated Jan. 29, 2018", 15 pgs.
"U.S. Appl. No. 14/502,993, Response filed May 11, 2018 to Advisory Action datted Apr. 16, 2018", 15 pgs.
"U.S. Appl. No. 14/502,993, Response filed Dec. 7, 2017 to Non Final Office Action dated Sep. 28, 2017", 13 pgs.
"U.S. Appl. No. 14/523,357, Ex Parte Quayle Action dated Aug. 10, 2017", 6 pgs.
"U.S. Appl. No. 14/523,357, Non Final Office Action dated Feb. 9, 2017", 9 pgs.
"U.S. Appl. No. 14/523,357, Notice of Allowance dated Nov. 8, 2017", 10 pgs.
"U.S. Appl. No. 14/523,357, Response filed May 9, 2017 to Non Final Office Action dated Feb. 9, 2017", 9 pgs.
"U.S. Appl. No. 14/523,357, Response filed Oct. 10, 2017 to Ex Parte Quayle Action dated Aug. 10, 2017", 9 pgs.
"U.S. Appl. No. 14/965,712, Preliminary Amendment filed Mar. 15, 2016", 7 pgs.
"U.S. Appl. No. 15/441,529, Non Final Office Action dated Nov. 17, 2017", 7 pgs.
"U.S. Appl. No. 15/441,529, Notice of Allowability dated Apr. 4, 2018", 2 pgs.
"U.S. Appl. No. 15/441,529, Notice of Allowance dated Mar. 19, 2018", 6 pgs.
"U.S. Appl. No. 15/441,529, Response filed Feb. 2, 2018 to Non Final Office Action dated Nov. 17, 2017", 8 pgs.
"U.S. Appl. No. 15/487,745, Preliminary Amendment filed Apr. 14, 2017", 8 pgs.
"International Application Serial No. PCT/US2013/033857, International Search Report dated Jul. 2, 2013", 2 pgs.
"International Application Serial No. PCT/US2013/033857, Written Opinion dated Jul. 2, 2013", 7 pgs.
"International Application Serial No. PCT/US2013/068763, International Search Report dated May 2, 2014", 2 pgs.
"International Application Serial No. PCT/US2013/068763, Written Opinion dated May 2, 2014", 5 pgs.
"International Application Serial No. PCT/US2015/020289, International Preliminary Report on Patentability dated Dec. 15, 2016", 8 pgs.
"International Application Serial No. PCT/US2015/020289, International Search Report dated Jun. 22, 2015", 2 pgs.
"International Application Serial No. PCT/US2015/020289, Written Opinion dated Jun. 22, 2015", 6 pgs.
Ackerman, Mark, "Sharing Expertise: Beyond Knowledge Management", The MIT Press (Cambridge, Massachusetts), (2003), 438 pgs.
Becerra-Fernandez, Irma, "Searching for Experts on the Web: A Review of Contemporary Expertise Locator Systems", ACM Transactions on Internet Technology 6(4), (Nov. 2006), 333-355.
D'Amore, Raymond, "Expertise Community Detection", SIGIR, (Jul. 25-29, 2004), 498-499.
Dom, Byron, et al., "A Bayesian Technique for Estimating the Credibility of Question Answerers", SIAM, (2008), 399-409.
Dom, Byron, et al., "Graph-Based Ranking Algorithms for E-mail Expertise Analysis", DMKD, (Jun. 13, 2003), 42-48.
Fu, Yupeng, et al., "Finding Experts Using Social Network Analysis", IEEE/WIC/ACM International Conference on Web Intelligence, (2007), 77-80.
Grolmus, Petr, et al., "A Web-Based User-Profile Generator: Foundation for a Recommender and Expert Finding System", 8th ICCC International Conference on Electronic Publishing, (Jun. 2004), 331-342.

(56) References Cited

OTHER PUBLICATIONS

Haselmann, Till, et al., "Towards a Conceptual Model for Trustworthy Skills Profiles in Online Social Networks", ERCIS, (2010), 13 pgs.

Huh, Eui-Nam, et al., "A Framework of Online Community based Expertise Information Retrieval on Grid", Kyung Hee University Memo, (Aug. 11, 2008), 21 pgs.

Huh, Eui-Nam, et al., "A Framework of Online Community based Expertise Information Retrieval on Grid", Kyung Hee University Memo, (Jan. 14, 2010), 21 pgs.

John, Ajita, et al., "Collaborative Tagging and Expertise in the Enterprise", WWW2006, (May 22-26, 2006), 6 pgs.

Li, Juanzi, et al., "EOS: Expertise Oriented Search Using Social Networks", WWW 2007 / Poster Paper, (May 8-12, 2007), 1271-1272.

Lin, Ching-Yung, et al., "SmallBlue: Social Network Analysis for Expertise Search and Collective Intelligence", IEEE International Conference on Data Engineering, (2009), 1483-1486.

Lin, Chin-Yung, et al., "SmallBlue: People Mining for Expertise Search", IEEE MultiMedia, 15(1), (2008), 78-84.

Malek, Maria, et al., "Exhaustive and Guided Algorithms for Recommendation in a Professional Social Network", EISTI-Laris laboratory, PRES Cergy University, (Jul. 31, 2010), 19 pgs.

Meyer, Bertolt, et al., "skillMap: dynamic visualization of shared organizational context", Institute of Information Systems, Humboldt University Berlin, (Feb. 20, 2006), 13 pgs.

Pretschner, Alexander, "Ontology Based Personalized Search", Department of Electrical Engineering and Computer Science, University of Kansas, (1998), 125 pgs.

Shuo, Chang, et al., "Competition over timeline in social networks", IEEE, (2013), 494-501.

Stankovic, Milan, et al., "Looking for Experts? What can Linked Data do for you?", LDOW, (Apr. 27, 2010), 10 pgs.

Steggles, Andy, "Keeping Score of Your Online Member Engagement", Associations Now, [Online]. Retrieved from the Internet: <URL: http://www.asaecenter.org/Resources/ANowDetail.cfm?ItemNumber=3828>, (Jan. 2009), 7 pgs.

Tang, Jie, et al., "ArnetMiner: An Expertise Oriented Search System for Web Community", International Semantic Web Conference—ISWC, (2007), 8 pgs.

Yimam-Seid, Dawit, et al., "Expert Finding Systems for Organizations: Problem and Domain Analysis and the DEMOIR Approach", Journal of Organizational Computing and Electronic Commerce 13(1), (2003), 1-24.

Zhang, Jing, et al., "Expert Finding in A Social Network", Department of Computer Science and Technology, Tsinghua, University Database Systems for Advanced Applications—DASFAA, (2007), 1066-1069.

"An Introduction to Cluster Analysis for Data Mining", Retrieved from:<<https://www-users.cs.umn.edu/~hanxx023/dmclass/cluster_survey_10_02_00.pdf>>, Oct. 2, 2000, 7 Pages.

"Notice of Allowance Issued in U.S. Appl. No. 14/072,955", dated Jul. 5, 2018, 8 Pages.

"Applicant Initiated Interview Summary Issued in U.S. Appl. No. 14/502,993", dated Nov. 13, 2018, 3 Pages.

"Final Office Action Issued in U.S. Appl. No. 14/502,993", dated Feb. 15, 2019, 25 Pages.

"Non Final Office Action Issued in U.S. Appl. No. 14/502,993", dated Aug. 10, 2018, 30 Pages.

"Response Filed in U.S. Appl. No. 14/502,993", dated Dec. 10, 2018, 14 Pages.

Chowdary, et al., "Evaluating and Analyzing Clusters in Data Mining using Different Algorithms", In International Journal of Computer Science and Mobile Computing, vol. 3, Issue 2, Feb. 2014, pp. 86-99.

Messmer, et al., "IT Security Skills Certifications on the Rise", Retrieved from: <<https://www.networkworld.com/article/2170044/security/7-it-security-skills-certifications-on-the-rise.html>>, Aug. 19, 2013, 5 Pages.

Singhal, et al., "A Comparative Study of Data Clustering Algorithms", In International Journal of Computer Applications, vol. 83, Issue 15, Dec. 2013, pp. 41-46.

\* cited by examiner

↗ 500

510
COUNT THE NUMBER OF INSTANCES THAT THE SPECIFIC SKILL IS LISTED ON THE PROFILE PAGE OF A MEMBER HAVING A SIMILAR JOB TITLE

520
COUNT THE NUMBER OF INSTANCES THAT THE SPECIFIC SKILL IS INCLUDED IN A JOB TITLE SECTION OF OTHER JOB POSTINGS

530
COUNT THE NUMBER OF INSTANCES THAT THE SPECIFIC SKILL IS INCLUDED IN A JOB DESCRIPTION SECTION OF OTHER JOB POSTINGS

540
COUNT THE NUMBER OF INSTANCES THAT THE SPECIFIC SKILL IS INCLUDED IN A DESIRED SKILLS SECTION OF OTHER JOB POSTINGS

550
CALCULATE THE SKILL FREQUENCY SCORE BASED ON THE NUMBER OF INSTANCES THAT THE SPECIFIC SKILL IS LISTED IN A PROFILE PAGE OF A MEMBER, A JOB TITLE SECTION, A JOB DESCRIPTION SECTION, OR A DESIRED SKILLS SECTION OF OTHER JOB POSTINGS

*FIG. 5*

APPLICANT SKILLS INFERENCE FOR A JOB

PRIORITY CLAIM

This application claims priority under 35 U.S.C. 119(e) to U.S. Provisional Patent Application Ser. No. 62/415,323, filed Oct. 31, 2016, which is incorporated herein by reference in its entirety.

TECHNICAL FIELD

The subject matter disclosed herein generally relates to data processing associated with a jobs database and a skill determination system. The skill determination system can infer a skill for a current job posting by using member data of job applicants.

BACKGROUND

A social networking system can maintain information on members, companies, organizations, employees, and employers. The social network system may maintain profile pages of members and company pages of companies. The profile page of a member can include skills of the member. Additionally, the social network system can maintain a job hosting service, which can include job postings for an employer. A job posting generally provides information about a particular job opening, including the employer (e.g., a company) and location at which the job opening is available, and an overview of the job responsibilities. However, some useful information may be missing or otherwise unavailable in the job posting. Furthermore, in many instances the viewer of a job posting may desire additional information in order to better assess the job posting.

BRIEF DESCRIPTION OF THE DRAWINGS

Some embodiments are illustrated by way of example and not limitation in the figures of the accompanying drawings.

FIG. 5 is a flowchart illustrating a method for updating the confidence score using a skill frequency score, according to some example embodiments.

DETAILED DESCRIPTION

Figure 1:
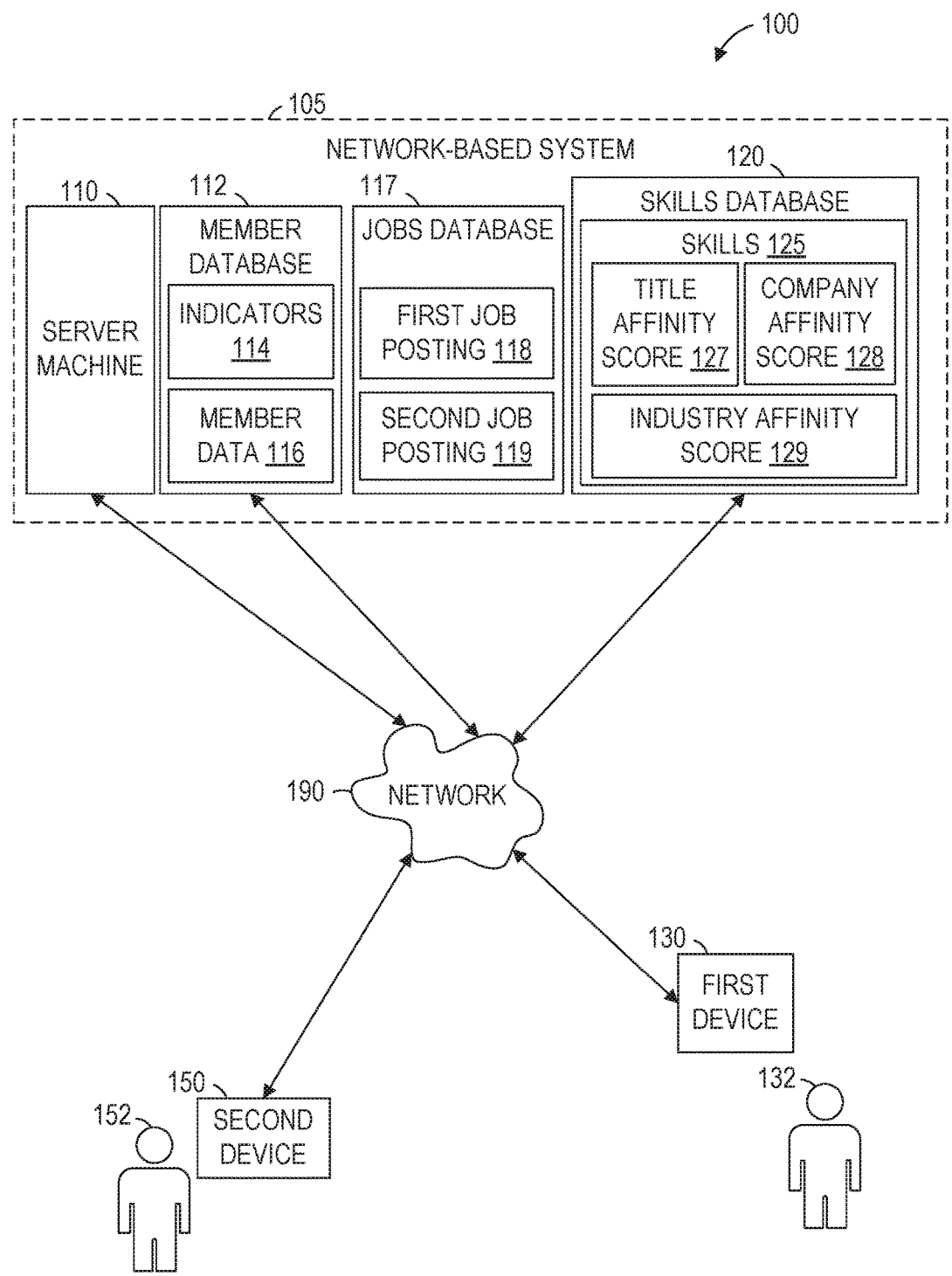
FIG. 1 is a network diagram illustrating a network environment suitable for a social network system, according to some example embodiments.

Examples merely demonstrate possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Example methods and systems are directed to techniques for inferring skills associated with a job posting using a skill determination system and a job posting database. More specifically, the present disclosure relates to methods, systems, and computer program products for determining the skills associated with a job using job applicant data and job posting data.

In current implementations, a social network system may not have a skills inference model to be able to automatically determine a skill for a specific job. In some instances, the only existing skills inference model may simply determine a skill for a specific member and not the specific job. With regards to the skills inference model for a member, the members of a social network system can explicitly include possessed skills on their profile page.

Additionally, some of the job postings on the social network system may not include a desired skill section that includes skills associated with a job. For example, in one social network system, it is estimated that only ten percent of the job postings include a desired skills section having explicit skills. Additionally, in practice, the desired skills section may only include free text that is similar to the job description segment. The free text can be user input that is not standardized (e.g., without a taxonomy associated with a list of skills) between different job postings. Accordingly, and unlike the skills inference model for determining a skill for a member, the skills inference model for determining a skill for a job may not be performed using an offline setting.

According to some embodiments, the skill determination system includes a skill inference model for jobs. By associating specific skills for a job, the skill determination system can be used to better match members with jobs and better match recruiters with potential hires. Additionally, the model can improve the click-through rate (CTR) value for a job search or a job referral.

According to some embodiments, the skill determination system can infer skills for a job using member data of job applicants that have applied for the job. For example, member data of a job applicant includes skills listed on the profile page of the job applicant. Using the member data of the job applicants, the skill determination system can determine the skills the actual job applicants possess, and therefore the inferred skills associated with the job.

Once the inferred skills have been determined for a job posting, the social network system can use the inferred skills to match members with the job posting. The inferred skills can be determined for a job posting when a confidence score associated with the likelihood of a skill being associated with a job posting is above a predetermined threshold. Additionally, a member possessing the inferred skill can be more likely to apply to a job posting, which can increase the CTR value of a job referral. Furthermore, using the association (e.g., matching) of an interred applicant skill with a job, an action module can better match members with recruiters during a job referral process or a job search process.

In some instances, the skill determinator can infer member skills based on job application history. For example, it can be assumed that a member applying to a job posting may likely possess the skills required by the job. By aggregating the skills of all the members that have applied to a job posting, the skill determinator can determine a set of skills associated with the job posting. Additionally, the set of skills can be ranked by calculating a confidence score for each skill. Furthermore, the skills with the highest confidence scores can be labeled as top skills. Members having the top skills can be potential job applicants, and the action module can present the job posting to the potential job applicants.

In a job recommendation example, using the inferred skill for a job posting, the action module can present the job posting to a member (e.g., job seeker) that possesses the inferred skill. The action module can present the job posting to a member of the social network system. The member can be an active job seeker, and the job recommendation can be presented on the home page or newsfeed for the job seeker. Alternatively, in another example, the job seeker can be presented to a recruiter that has published a job posting on the social network system.

In a job search example, a job search algorithm can be specialized for a member by highlighting job postings that have an inferred skill that the member possesses. In some instances, a member of the social network system may want to search for a job posting. For example, a list of job postings having an inferred skill that the member possesses can be presented to the member. With the association of a skill and a job stored in the skills database, the search results can be personalized for each member based on the possessed skills of the member. Additionally, the job postings are ranked further based on the likelihood that the member has the skills associated with the job. By presenting job postings that are more tailored to each member, a member can save time and resources by applying for jobs that are more aligned with the member's skill set.

In the skill suggestion example, the action module can present the inferred skill of the job posting to a recruiter. For example, when the recruiter is creating the job posting, the action module can suggest an inferred skill in the desired skill section of the job posting.

According to some embodiments, the social network system includes a specialized skills database having a database architecture tailored specifically for skills. As a result, the skills database allows for a faster data retrieval rate based on an association with specific jobs. Additionally, the skills database allows for faster data processing related to the skills. For example, when a recruiter searches for potential hiring candidates, the profile pages of members that have the desired skills are presented in real-time to the recruiter. Furthermore, the skills database can include a skill quality metric that can deliver more insights about the skill of the member or the skill associated with a job.

Additionally, techniques described herein allow for presenting a potential candidate for a job or presenting a job posting for a job seeker based on a confidence score associated with the determined skill. Techniques described herein allow for faster processing speed for processing the skills data to determine the confidence score in real time. Additionally, techniques described herein allow for a faster retrieval of the skills data.

FIG. 1 is a network diagram illustrating a network environment 100 suitable for a social network system, according to some example embodiments. The network environment 100 includes a server machine 110, a member database 112, a jobs database 117, a skills database 120, a first device 130 for a first user 132, and a second device 150 for a second user 152, all communicatively coupled to each other via a network 190. The server machine 110, the member database 112, the jobs database 117, and the skills database 120 may form all or part of a network-based system 105 (e.g., a cloud-based server system configured to provide the social network system to the first device 130 and second device 150). The server machine 110, the first device 130, and the second device 150 may each be implemented in a computer system, in whole or in part, as described below with respect to FIG. 7.

The member database 112 can include indicators 114, member data 116, company data, and education data for the social network system. In some instances, the member database 112 can include a plurality of databases (e.g., a first database to store profile data, a second database to store social data, a third database to store member activity data, and a fourth database to store the indicators 114). The server machine 110 can access the information in the member database 112 using the network 190.

The indicators 114 can be unique reference numbers that correspond to job postings that a member has already applied to. For example, based on the privacy setting of the member, the network-based system 105 can store an indicator (e.g., reference number) associated with each job posting that the member has applied. The member data 116 includes profile data, social graph data, and member activity data.

Additionally, the network-based system 105 includes a jobs database 117. The jobs database 117 includes current job postings, such as a first job posting 118 and a second job posting 119. Furthermore, the jobs database 117 includes an archive of previous job postings. The previous job postings can include metrics about the type of job applicants and metrics about the members who successfully obtain the job associated with the job posting. For example, the metrics can be used by the skill determinator to determine an inferred skill for a current job posting with a similar job title as an archived job posting.

Moreover, the skills database 120 can store a plurality of skills 125. The plurality of skills 125 can be standardized skills. For example, the standardized skills can be listed on a profile page of a member, or in the desired skills section of a job posting. Each skill in the plurality of skills 125 can be associated with a title affinity score 127, a company affinity score 128, and an industry affinity score 129. Moreover, a skill can have or be associated with a "title at a company" affinity score, a "function at a company" affinity score, and a "title at an industry" affinity score.

The title affinity score 127 can be a measure of how likely a skill corresponds with a job described by the job title. The company affinity score 128 can be a measure of how likely a skill corresponds with a job in a specific company. The industry affinity score 129 can be a measure of how likely a skill corresponds with a job in a specific industry. For example, the title affinity score 127 is a likelihood that a certain skill is associated with a job posting of a certain job title in general, whereas the skill determinator analyzes the job posting and sums the different affinity scores to determine the confidence score of a specific skill being needed for the job posting.

With some embodiments, skills 125 may include specific skills such as the ability to program in a particular programming language, such as Java or C++, or broader skills, such as the ability to program a computer, or specialized skills such as programming web-based applications. While reference is made to skills in the present disclosure, it will be understood by those skilled in the art, with the benefit of the present disclosure, that the techniques taught herein are applicable to other concepts.

The standardized list of skills may be obtained by utilizing a pre-determined list of skills. In one example, the predetermined list of skills may be manually generated, but in other examples the pre-determined list of skills may be automatically generated. In still other examples, the list of standardized skills may be created by processing member profiles of the social network system. In some examples, this processing can be done automatically using a computing system or other machine. In yet other examples, this processing could be manually accomplished. In some examples, a skills section of a member profile of a social network system may be used. The skills section of the member profile may be a raw text (e.g., free-text) section that allows users to freely type in skills they possess (this information is generally referred to as unstructured information). Alternatively, in some other examples, the member profile skills section may be implemented as a list that allows users to choose a skill based upon structured data such as a predetermined listing of skills. In other examples, the skills section may be implemented as some combination of unstructured data such as free-text and structured data such as a pre-determined list selection.

Furthermore, techniques for generating a standardized list of skills and selecting a skill from the job posting are further described in U.S. patent application Ser. No. 13/357,360 filed on Jan. 24, 2012, titled "SKILL CUSTOMIZATION SYSTEM," which is hereby incorporated by reference in its entirety. The referenced document describes a social network system that is able to automatically build a standardized list of skills, automatically associate a member with a specific skill, and customize a member's experience on the social network system based upon the associated skills. The selection of a specific skill to associate with a job posting can use similar techniques as those described in the referenced documents.

Also shown in FIG. 1 are the users 132 and 152. One or both of the users 132 and 152 may be a human user (e.g., member of the social network system), a machine user (e.g., a computer configured by a software program to interact with the first device 130 or the second device 150), or any suitable combination thereof (e.g., a human assisted by a machine or a machine supervised by a human). The user 132 is not part of the network environment 100, but is associated with the first device 130 and may be a user of the first device 130. For example, the first device 130 may be a desktop computer, a vehicle computer, a tablet computer, a navigational device, a portable media device, a smartphone, or a wearable device (e.g., a smart watch or smart glasses) belonging to the user 132. Likewise, the user 152 is not part of the network environment 100, but is associated with the second device 150. As an example, the second device 150 may be a desktop computer, a vehicle computer, a tablet computer, a navigational device, a portable media device, a smartphone, or a wearable device (e.g., a smart watch or smart glasses) belonging to the user 152.

In some instances, the user 132 can be a job applicant who is applying to job postings on the social network system. Additionally, the user 152 can be a recruiter that has listed a job posting and is searching for potential job applicants for the job posting. The skill determination system can match a job applicant with the recruiter using an inferred skill of the job posting. For example, the server machine 110 can transmit a message to the user 132, using network 190, that a job posting is tailored to the user 132 based on the inferred skill associated with the job.

The network 190 may be any network that enables communication between or among machines, databases, and devices (e.g., the server machine 110 and the first device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a Wi-Fi network or WiMAX network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Any of the machines, databases, or devices described herein may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 7. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices described herein may be combined into a single machine, database, or device, and the functions described herein for any single machine, database, or device may be subdivided among multiple machines, databases, or devices.

Figure 2:
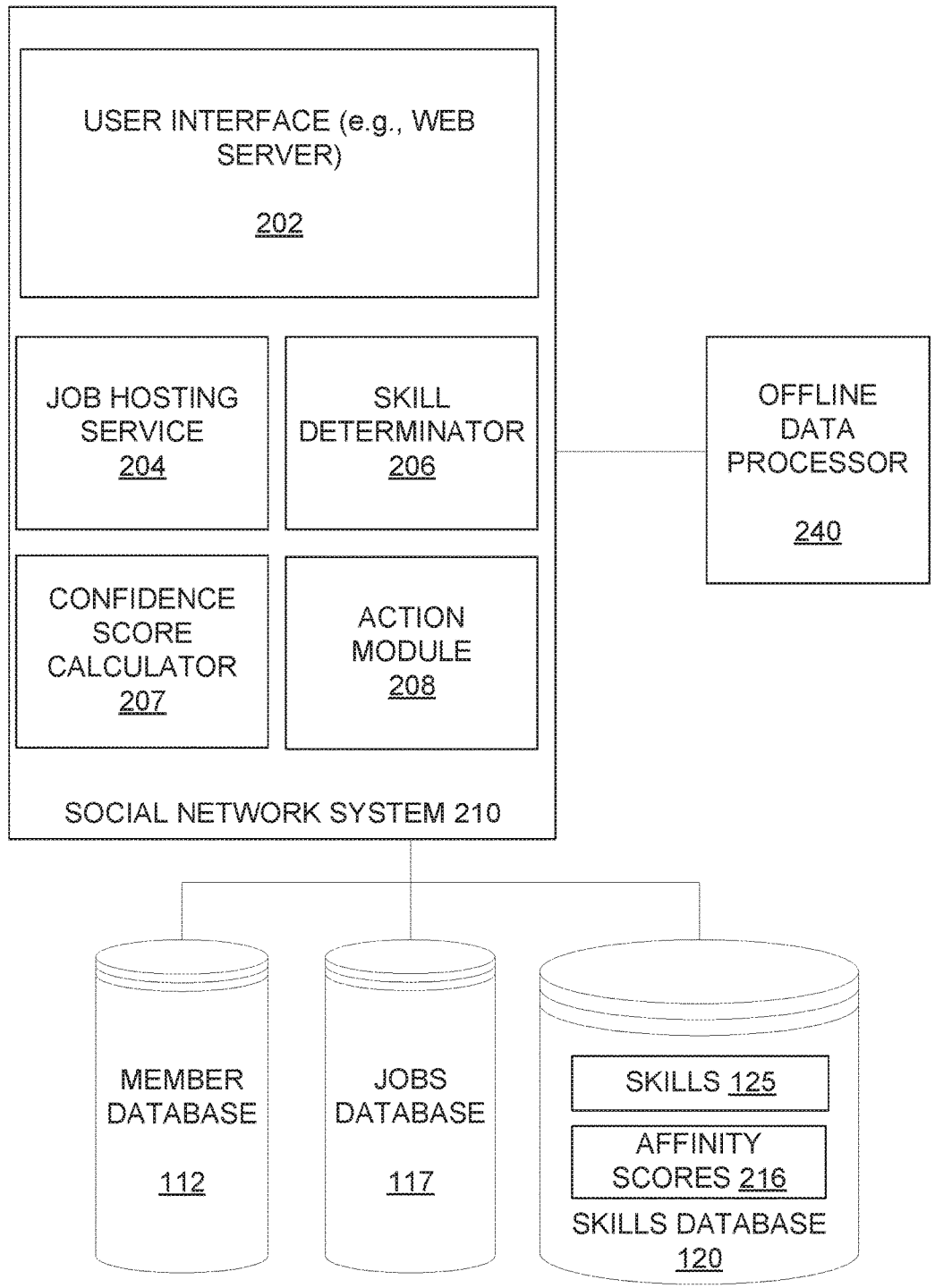
FIG. 2 is a block diagram illustrating various components of a social network system, according to some example embodiments.

FIG. 2 is a block diagram illustrating components of a social network system 210 (e.g., a social networking service), according to some example embodiments. The social network system 210 is an example of a network-based system 105 of FIG. 1. The social network system 210 can include a user interface 202, a job hosting service 204, a skill determinator 206, a confidence score calculator 207, and an action module 208. Two or more of the components 202-208 may be configured to communicate with each other (e.g., via a bus, shared memory, or a switch).

The user interface 202 can provide information or cause an interface to be rendered on a client device of a member. For example, the user interface 202 can present, to user 132, a job posting having an inferred skill that is possessed by the user 132. Additionally, the user interface 202 can present to a recruiter a profile of a potential job candidate that possesses an inferred skill of a job posting.

Additionally, the social network system 210 can communicate with the member database 112, the jobs database 117, and the skills database 120 of FIG. 1. As later described in FIG. 3, the confidence score calculator 207 can calculate a confidence score for a skill being associated with a job based on information accessed from the member database 112, the jobs database 117 and the skills database 120. In some instances, some of the processing of the data for determining the confidence score can be performed by an offline data processor 240 on a periodic basis (e.g., nightly) in order to return faster calculation results.

As previously mentioned in FIG. 1, the member database 112 can store indicators 114 and member data 116, such as profile data, social graph data, and member activity data. The profile data includes information from a profile page of a member, such as skills possessed by the member. The jobs database 117 stores jobs data, such as current job postings and archived job postings. Additionally, the jobs data includes metrics of job applications, such as location, school information, years of experience, industry, interview rate, job offer rate, and job acceptance rate.

The profile data can be used to determine the confidence score for a specific skill being associated with a job. For example, the confidence score depends on the profile data (e.g., job title, degree, industry, skills) of members having a similar job title, employer, industry as the job listed in the job posting. Profile data related to the specific skill includes having the specific skill listed on the profile page, a recommendation associated with the specific skill, a degree associated with the specific skill, a job title associated with the specific skill, and other educational and/or employment data associated with the specific skill. Additionally, the social network system 210 maintains associations among various skills, and skills associated with the specific skill may be determined to be the same or related.

When a user registers to become a member of the social network system 210, the member is prompted to provide a variety of personal and employment information that may be displayed in the member's profile page. As used herein, personal and/or employment information is referred to as profile data. The profile data can be used to determine the confidence score of a specific skill being associated with a job. The profile data that is commonly requested and displayed as part of a member's profile page includes the member's age, birthdate, gender, interests, contact information, home location (e.g., city and state), educational background (e.g., schools, majors, matriculation dates, graduation dates, etc.), employment history, office location, skills, professional organizations, and other such personal and/or employment information. In some embodiments, the profile data may include the various skills that each member has indicated he or she possesses. Additionally, the profile data may include skills of a member that have been endorsed by another member. Furthermore, the profile data may include recommendations of a member from another member (e.g., co-worker).

Moreover, the profile data can include information commonly included in a professional resume or curriculum vitae, such as information about a person's education, the company at which a person is employed, the location of the employer, an industry in which a person is employed, a job title or function, an employment history, skills possessed by a person, professional organizations of which a person is a member, and so on.

The social graph data includes a digital representation of a member's relationship with other members of the social network system 210. The social graph data can be associated with an entity's presence within the social network system 210. For example, consistent with some embodiments, a social graph is implemented with a specialized graph data structure in which various entities (e.g., people, companies, schools, government institutions, non-profits, and other organizations) are represented as nodes connected by edges, where the edges are of different types representing the various associations and/or relationships among the different entities. The social graph data of a member can include first-degree connections, second-degree connections, and so on. In one embodiment, a first member is a first-degree connection to a second member when the first and second members are directly connected to each other in the social network system 210.

In some instances, the member data 116 may include member activity data. The member activity data include members' interactions with the various applications, services, and content made available via the social network system 210, and a member's behavior (e.g., content viewed, links selected, etc.) may be used to determine the member's proficiency in a specific skill.

The skills database 120 stores a list of skills 125. The list of skills 125 can be standardized, and each skill can have an association with one or more related jobs. For example, as later described with reference to FIG. 3, when the confidence score for a specific skill being associated with a job is above a predetermined threshold, then the association is stored in the skills database 120. Additionally, the skills database 120 stores affinity scores 216, such as a title affinity score 127, a company affinity score 128, an industry affinity score 129, a "title at a company" affinity score, a "supertitle at a company" affinity score, a "function at a company" affinity score, and a "title at an industry" affinity score.

For example, the title affinity score 127 corresponds to the affinity of a title with the specific skill. The company affinity score 128 corresponds to the affinity of a company with the specific skill. The industry affinity score 129 corresponds to the affinity of an industry with the specific skill. The "title at a company" affinity score corresponds to the affinity of a specific title at a company with the specific skill. The "supertitle at a company" affinity score corresponds to the affinity of a specific supertitle at a company with the specific skill. The supertitle can be a more general title that includes a group of job titles. The "function at a company" affinity score corresponds to the affinity of a specific function at a company with the specific skill. The "title at an industry" affinity score corresponds to the affinity of a specific title in an industry with the specific skill.

In some instances, the skill determination system can obtain the affinity scores 216 for the specific skill after the standardized job title, company, industry, and/or function have been determined for the job posting. Additionally, the confidence score calculator 207 can calculate the confidence score for the skill using one or more of the affinity scores 216 associated with the specific skill.

Additionally, the social network system 210 can include a job hosting service 204 having job postings. For example, a recruiter can post a job posting for a job on the job hosting service 204, and a job applicant can apply to a job posting on the job hosting service 204. In some instances, when the job applicant is a member of the social network system 210, the job applicant's information can be automatically filled for the job posting, and the job applicant can simply review and submit the application.

Furthermore, the social network system 210 can include a skill scraper that obtains raw text from the job posting. For example, a job posting includes a job title section, a job description section, and a desired skill section. In some instances, the content of the job title section, the job description section, and the desired skill section include raw text (e.g., plain text). The skill scraper can compare the plain text in the job posting with the list of skills 125 stored in the skills database 120 to determine a match or a similarity. The skill scraper can retrieve the words in the job posting that are determined to be a potential skill based on the comparison with the list of skills 125.

Moreover, the confidence score can be further based on a skill frequency value. The confidence score calculator 207 can calculate the skill frequency value of the specific skill. The skill frequency value can be calculated by determining the number of members with the specific skill on their profile, or by determining the number of skill mentions in current job postings. The skill frequency value associated with a member can be based on the frequency of appearance of the specific skill in profiles of members. The skill frequency value can be calculated for members with a specific job title, in a specific industry, in a specific company, or with a specific seniority. The skill frequency value associated with current job postings can be based on the frequency of the specific skill being mentioned in the job description section of active job postings. The skill frequency value associated with the current job postings can also be based on the frequency of the specific skill being mentioned in the desired skills section of active job postings.

Furthermore, the action module 208 can perform an action when the confidence score transgresses a predetermined threshold. In some instances, when the confidence score for the likelihood that the specific skill is associated with a job is above the predetermined threshold (e.g., 80 out of 100), then the specific skill is determined to be an inferred skill for the job posting. An association between the specific skill and the job can be stored in the skills database 120. For example, the specific skill is a skill in the list of skills 125, and the specific skill is linked to the job as a related job for the specific skill.

In response to a determination of an inferred skill for a job posting, the action module 208 can present a profile page of a member that possesses the specific skill to a recruiter that has published a job posting for a job that is associated with the specific skill. Alternatively, the action module 208 can also present the job posting associated with the specific skill to a member that possesses the specific skill.

In some instances, the social network system 210 can be configured to process data offline or periodically using an offline data processor 240. In some instances, some or all of the selections and calculations performed by the skill determinator 206 and confidence score calculator 207 can be performed by the offline data processor 240. For example, the offline data processor 240 can include one or more large-scale processing servers, such as Apache™ Hadoop® servers that access the member database 112, the jobs database 117, and the skills database 120 periodically (e.g., on a nightly basis) in order to calculate the confidence scores, the affinity scores 216, and the skill frequency scores.

Calculating the confidence score of the specific skill being associated with the job posting may be computationally intensive. Therefore, some of the calculating and selecting can be done offline, such as the calculating of one or more parameters (e.g., affinity score, skill frequency score) associated with the confidence score. For example, the data (e.g., the member data 116, from the jobs database 117, and from the skills database 120) may be processed offline by the confidence score calculator 207 to determine the confidence score. By having the one or more parameters calculated offline, less real-time processing time may be needed by the confidence score calculator 207 in order to calculate the confidence score for each skill. As a result, these parameters can be inputted in the confidence score calculator 207 in real time in order to almost instantaneously present the job posting to a member, or the profile page of a member to a recruiter.

Figure 3:
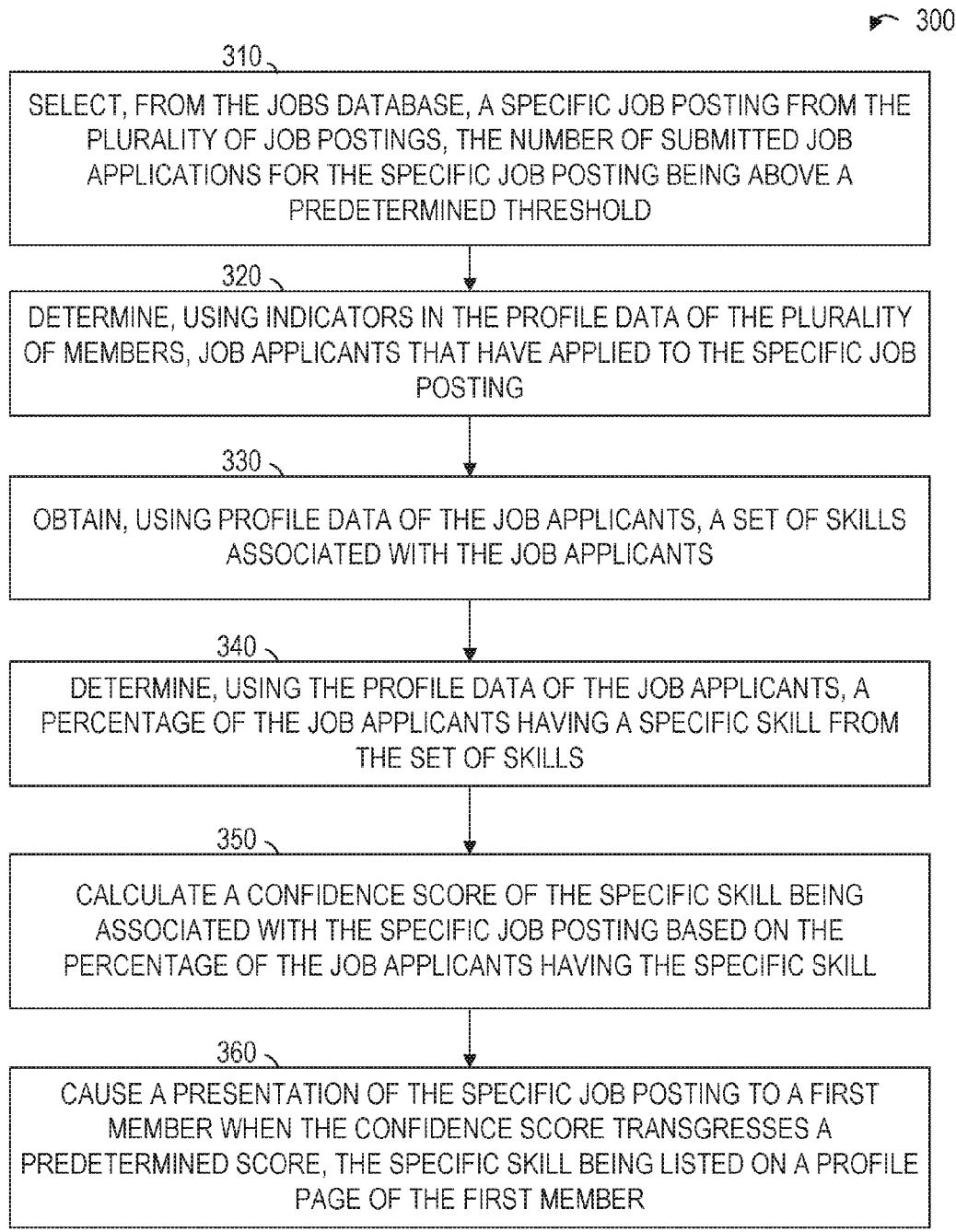
FIG. 3 is a flowchart illustrating a method for calculating a confidence score and presenting a job posting based on the confidence score, according to some example embodiments.
Figure 4:
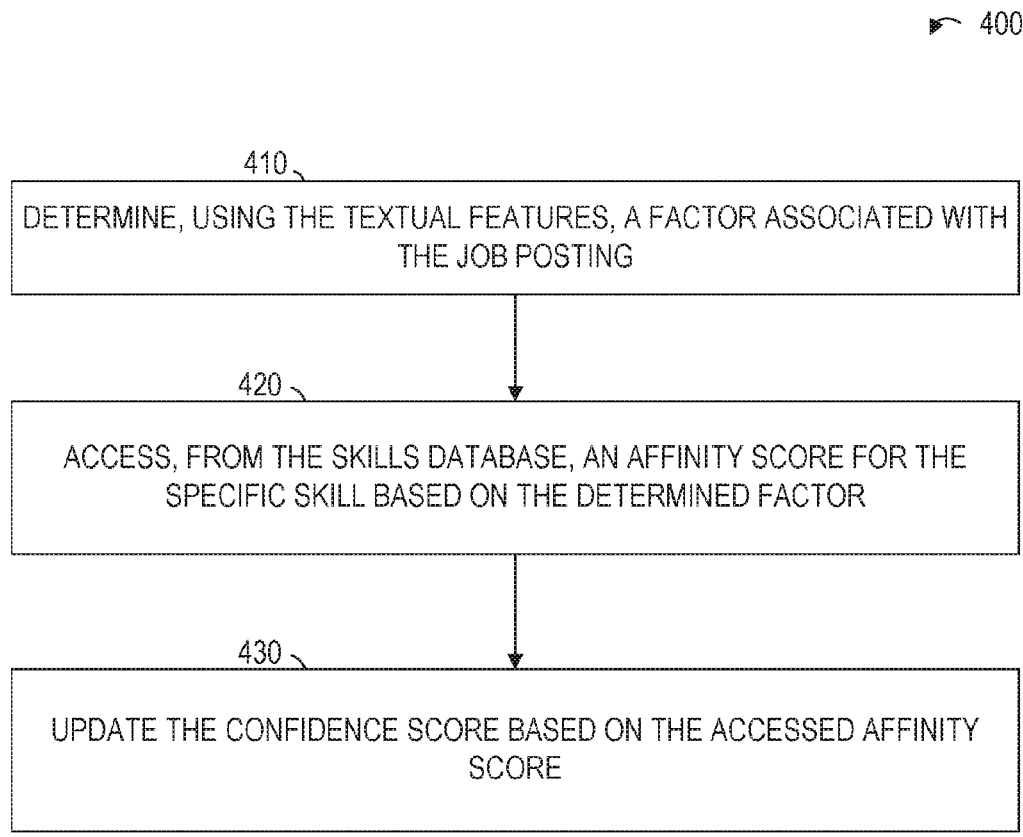
FIG. 4 is a flowchart illustrating a method for updating the confidence score using an affinity score, according to some example embodiments.

As will be further described with respect to FIGS. 3-5, the confidence score calculator 207 can calculate the confidence score for the likelihood of a specific skill being associated with the job posting. Additionally, the specific skill is determined to be an inferred skill for the job posting when the confidence score transgresses a predetermined threshold. Furthermore, the user interface 202 can present the job posting to a member that possesses the inferred skill.

FIG. 3 is a flowchart illustrating operations of the social network system 210 in performing a method 300 for determining whether a specific skill is associated with a job posting, according to some example embodiments. Operations in the method 300 may be performed by the social network system 210, using the skill determinator 206, the confidence score calculator 207, and the action module 208 as described above with respect to FIG. 2.

As previously mentioned, the social network system 210 includes a jobs database 117 storing a plurality of job postings. The job postings can be posted on the social network system 210 via the job hosting service 204 or on a third-party site. Additionally, a job posting in the plurality of job postings can have a counter for a number of submitted job applications.

Furthermore, the social network system 210 includes a member database 112 storing profile data of a plurality of members in the social network system 210. The profile data of a member in the plurality of members includes a plurality of skills listed on a profile page of the member. The profile data of a member can further include an indicator that the member has applied to a job posting in the plurality of job postings. The profile data can be part of the member data 116 and the indicator can be part of the indicators 114 described in FIG. 1.

At operation 310, the skill determinator 206 selects, from the jobs database 117, a specific job posting from the plurality of job postings. In some instances, the specific job posting is posted on the job hosting service 204 of the social network system 210. Additionally, the specific job posting is selected based on the number of submitted job applications for the specific job posting being above a predetermined threshold. In some instances, the threshold number can be 10, 50, or 100. For example, the job hosting service 204 can keep a counter for the number of members that have applied to the specific job posting that is posted on the job hosting service 204. Continuing with the example, the skill determinator 206 can select the first job posting 118 because more than 100 members of the social network system 210 have applied to the first job posting 118. A processor in the server machine 110 can access the job posting that is published on the social network system 210 using the network 190 in order to select the specific job posting.

At operation 320, the skill determinator 206 determines, using indicators 114 in the profile data of the plurality of members, job applicants that have applied to the specific job posting. In some instances, the indicators 114 can be part of the profile data stored in the member database 112. Based on a member's privacy settings, the indicators 114 can include an indication that the member has applied to the specific job posting selected at operation 310. For example, the indicator can be a reference number associated with a job posting that is posted on the job hosting service 204. The job hosting service 204 can label each job posting with a unique reference number. Accordingly, the skill determinator 206 can determine the job applicants that have applied to the specific job posting by searching the profile data for the unique reference number that is associated with the specific job posting. A processor in the server machine 110 can access, using the network 190, the member database 112 to obtain the indicators 114 in order to determine the job applicants for the specific job posting.

At operation 330, the skill determinator 206 obtains a set of skills associated with the job applicants. In some instances, the skill determinator 206 can obtain the skills using the profile data of the job applicants. For example, each member of the social network system 210 can have a profile page that includes a list of skills that the member possesses. The skill determinator 206 can access the profile data of each job applicant to obtain (e.g., generate) a set of skills (e.g., skills 125) associated with all of the job applicants. The set of skills can include an aggregation (e.g., summation) of all of the skills that are possessed by all of the job applicants. Alternatively, the set of skills can include all of the skills that are possessed by at least a certain number (e.g., two or more) of the job applicants. A processor in the server machine 110 can access, using the network 190, the member database 112 to obtain the set of skills associated with the job applicants.

At operation 340, the skill determinator 206 determines, using the profile data of the job applicants, a percentage of the job applicants having a specific skill from the set of skills. In some instances, the skill determinator 206 can select a skill that is possessed by most of the job applicants as the specific skill. For example, each skill in the set of skills can include a counter number associated with the number of job applicants possessing the skill. Accordingly, the specific skill can be selected using the counter number for each skill in the set of skills, such as selecting the skill with the highest counter as the specific skill. The percentage can be determined by dividing the counter number for the specific skill by the total number of job applicants for the specific job posting. For example, to determine the percentage of the job applicants having the specific skill, the skill determinator 206 can divide the counter number associated with the specific skill by the total number of job applicants. A processor in the server machine 110 can select the specific skill and determine the percentage of the job applicants having the specific skill.

In another example, the skill determinator 206 can obtain the counter number associated with the number of job applicants having the specific skill at operation 340, and the confidence score calculated at operation 350 is calculated simply based on the counter number obtained at operation 340.

In yet another example, the skill determinator 206 can obtain the counter number associated with the number of job applicants having the specific skill that have received an interview at operation 340, and the confidence score calculated at operation 350 is calculated based on the counter number obtained at operation 340.

In yet another example, the skill determinator 206 can obtain the counter number associated with the number of members having the specific skill that have been being hired for a similar job posting at operation 340, and the confidence score calculated at operation 350 is calculated based on the counter number obtained at operation 340.

At operation 350, the confidence score calculator 207 calculates a confidence score of the specific skill being associated with the specific job posting based on the percentage of the job applicants having the specific skill. In some instances, the confidence score is directly proportional to the percentage determined at operation 340, such that the confidence score increases when the percentage increases, and vice-versa. In one example, the confidence score is equal to the percentage determined at operation 340. A processor in the server machine 110 can calculate the confidence score in real time. In some instances, part of the calculation of the confidence score can be performed offline using the offline data processor 240.

As later described, the confidence score calculator 207 can update the confidence score of the specific skill being associated with the job posting based on the affinity scores 216, the skill frequency score, the job title coefficient, the job description coefficient, and/or the desired skills coefficient. For example, the confidence score can be an average the percentage determined at operation 340, the affinity scores 216, and the skill frequency score. The confidence score can range from 0-100. A higher score can be associated with the specific skill being more likely to be associated with the job posting than another job posting having a lower score.

According to some embodiments, the confidence score can be calculated using Equation 1:

$$\text{Confidence Score} = C_0(\text{Percentage of Job Applicants possessing the Specific}) + C_1(\text{Affinity Score}) + C_2(\text{Skill Frequency Score}) + C_3(\text{Job Title Mentions}) + C_4(\text{Job Description Mentions}) + C_5(\text{Desired Skills Mentions}), \quad \text{(Equation 1)}$$

where $C_0 \ldots C_5$ are coefficients with a range from 0 to 1.

At operation 360, the user interface 202 causes a presentation of the specific job posting to a first member when the confidence score transgresses a predetermined threshold score. The first member can be selected based on the specific skill being listed on a profile page of the first member. In some instances, the predetermined threshold score (e.g., 80 out of 100) can be preset by an administrator of the social network system 210. Additionally, the predetermined threshold score can be adjusted in direct correlation with the number of specific skills associated with job posting. For example, the predetermined threshold score is decreased when the job posting does not have any specific skills associated with the job posting.

In some instances, the method 300 can further include the skill determinator 206 ranking each skill in the set of skills based on a confidence score for each skill in the set of skills. For example, each skill can be ranked from the highest confidence score to the lowest confidence score.

Additionally, the skill determinator 206 can select the first member at operation 360 from the plurality of members based on a predetermined number of top skills being listed on the profile page of the first member. A top skill can be a skill that is above a predetermined threshold (e.g., 90 out of 100), or can be a skill having one of the highest confidence score. For example, the first member is selected at operation 360 because the first member possesses two out of the top three skills associated with the job posting, three out of the top five skills, or another ratio of top skills. In another example, the first member is selected because the first member possesses the three highest ranking skills associated with the specific job posting. As previously mentioned, the first member can possess a specific skill when the specific skill is listed on the profile page of the first member.

Moreover, the first member selected at operation 360 can be selected from the plurality of members based on the first member having an indicator that the first member has not previously applied to the specific job posting. The indicator can be part of the indicators 114 stored in the member database 112. For example, only members that have not previously applied to the specific job posting are shown the presentation of the specific job posting at operation 360.

According to some embodiments, the social network system 210 can access the skills database 120. The skills database 120 stores an association between a skill and a job posting. Additionally, the action module 208 can store, in the skills database 120, an association of the specific skill with the specific job posting when the confidence score transgresses the predetermined score. For example, the action module 208 stores, in the skills database 120, an association of the specific skill with the job posting when the confidence score transgresses a predetermined threshold. The association can be stored in the skills database 120 when the confidence score calculated at operation 360 is above a predetermined threshold. In some instances, the predetermined threshold (e.g., 80 out of 100) can be preset by an administrator of the social network system 210.

According to some embodiments, the method 300 can further include the skill determinator 206 determining that the specific skill is mentioned in a job title section of the specific job posting. For example, the skill determinator 206 can extract the raw text from the job title section. Then, the skill determinator 206 can compare the words in the raw text with the specific skill selected at operation 350. When it is determined that the specific skill is mentioned in the job title section, the skill determinator 206 can access, from the skills database 120, a job title coefficient for the specific skill, and increase the confidence score of the specific skill being associated with the specific job posting based on the job title coefficient. In the example described in Equation 1, the job title coefficient can equal $C_3$.

For example, when the raw text in the job title section includes "programmer," and the specific skill selected at operation 340 is "programming," then the confidence score is increased by the job title coefficient. Additionally, the confidence score can increase when the job posting includes a term that is associated with the specific skill. In this example, the confidence score is increased by the job title coefficient when the specific skill is "programming" and "Java" is included in the raw text of the job title. In some instances, a skill, such as "programming," is associated with the job when the job posting includes key raw text (e.g., Java, C++, python) that is associated with the specific skill.

In some examples, the job description can include a raw text (e.g., free-text) section that allows recruiters to freely type in skills necessary for the job posting (this information is generally referred to as unstructured information). Alternatively, in some other examples, such as the desired skills section of the job description, the recruiter may be allowed to selected skills from a list based upon structured data such as a predetermined list of skills 125.

Additionally, method 300 can further include the skill determinator 206 determining that the specific skill is mentioned in a job description section of the specific job posting. The skill determinator 206 can access, from the skills database 120, a job description coefficient for the specific skill when determined that the specific skill is mentioned in the job description section. Subsequently, the skill determinator 206 can increase the confidence score of the specific skill being associated with the specific job posting based on the job description coefficient. In some instances, the confidence score is further increased based on a number of instances the specific skill is explicitly mentioned in the job description section. In the example described in Equation 1, the job description coefficient can equal $C_4$.

Furthermore, the method 300 can further include the skill determinator 206 determining that the specific skill is mentioned in a desired skills section of the specific job posting. The skill determinator 206 can access, from the skills database 120, a desired skill coefficient for the specific skill when it is determined that the specific skill is mentioned in the desired skills section. Subsequently, the skill determinator 206 can increase the confidence score of the specific skill being associated with the specific job posting based on the desired skill coefficient. In the example described in Equation 1, the desired skills coefficient can equal $C_5$.

In some instances, the method 300 can further include the skill determinator 206 determining a job title for the specific job posting. The skill determinator 206 can select a standardized job title for the job posting using the raw text in the job title section of the job posting. For example, the raw text in the job title section of the job posting can include keywords (e.g., Java programmer) that are associated with a specific standardized job title (e.g., software developer). Additionally, the skill determinator 206 can determine, using the profile data of the plurality of members, a skill frequency score associated with the specific skill and the determined job title, the skill frequency score being based on the specific skill being listed on a profile page of one or more members in the plurality of members that are associated with the determined job title. Subsequently, the skill determinator 206 can update the confidence score of the specific skill being associated with the specific job posting based on the skill frequency score. In the example described in Equation 1, the skill frequency score can be multiplied by $C_2$.

For example, the skill determinator 206 determines a skill frequency score associated with the specific skill. In some instances, the skill frequency score is calculated using the number of times the specific skill is listed on a profile page of members in the plurality of members that are associated with the job title. A processor in the server machine 110 can determine the skill frequency score for the specific skill. Additionally, FIG. 5 further describes a method 500 for calculating the skill frequency score for the specific skill.

In some instances, the method 300 can further include the user interface 202 presenting, on a display of a device of a recruiter associated with the specific job posting, a profile of a member having the specific skill when the confidence score transgresses the predetermined threshold. Additionally, the user interface 202 can present, on a display of a device of user 132 (e.g., the first device 130), an indication that the job posting is associated with the specific skill. Subsequently, the user interface 202 can receive a user input from the user 132 (e.g., recruiter) to include the specific skill in the desired skill section of the job postings.

In some instances, the user interface 202 can present, on a display of a device of a recruiter associated with the job posting, a profile of a member having the specific skill when the confidence score transgresses the predetermined threshold. For example, the user interface 202 presents a potential job candidate to the recruiter based on the job posting being associated with the specific skill, and the job candidate possessing the specific skill.

In some instances, the user interface 202 can present, on a display of a device of a member having the specific skill, the job posting when the confidence score transgresses the predetermined threshold. For example, the user interface 202 presents the job posting to a member that is actively looking for a new position. The job posting can be presented based on a match that the member possesses with the specific skill that is determined to have a confidence score transgressing the predetermined threshold for the job posting.

In some instances, the search results for job postings are tailored based on the inferred skills associated with a job posting and the skills possessed by the member requesting the search results.

FIG. 4 is a flowchart illustrating operations of the social network system 210 in performing method 400 for updating the confidence score based on an affinity score, according to some example embodiments. Operations in the method 400 may be performed by the network-based system 105, using the skill determinator 206 and confidence score calculator 207 described above with respect to FIG. 2.

In some instances, the confidence score calculated at operation 350 can be updated based on the affinity score obtained in method 400.

At operation 410, the skill determinator 206 can determine a factor associated with the job posting using the textual features. The factors can include, but are not limited to, a job title, a company, an industry, a job title at a company, a function at a company, and a title at an industry.

At operation 420, the confidence score calculator 207 can access, from the skills database 120, an affinity score for the specific skill based on the determined factor.

At operation 430, the confidence score calculator 207 can update the confidence score calculated at operation 360 based on the affinity score accessed at operation 420. Continuing with the example at operation 420, the confidence score for associating legal skills with an associate position at a law firm is increased, while the confidence score for associating legal skills with an associate position at a consulting firm is decreased. A processor in the server machine 110 can update the confidence score.

For example, the skills database 120 includes a title affinity score 127 for a job title and a skill. The method 300 can further include the skill determinator 206 determining a job title associated with the specific job posting. The job title can be the factor determined at operation 410. The job title can be determined from a list of standardized job titles as described herein. Additionally, the skill determinator 206 can access, from the skills database 120, a title affinity score 127 for the specific skill and the job title. Subsequently, the skill determinator 206 can update the confidence score of the specific skill being associated with the specific job posting based on the accessed title affinity score. In the example described in Equation 1, the title affinity score 127 can be multiplied by $C_1$.

For example, the skill determinator 206 accesses, from the skills database 120, an affinity score for the specific skill based on the selected job title at operation 420. The skill determinator 206 can access the affinity scores 216 from the skills database 120. The skills database 120 includes a title affinity score 127 for the affinity of the selected job title with the specific skill. For example, the skill determinator 206 accesses the affinity score for the likelihood of needing the "programming" skill when applying for a "software developer" job position. The confidence score can be updated based on the accessed affinity score.

In some instances, the social network system 210 can access a standardization database storing a plurality of standardized job titles. Additionally, each skill in the plurality of skills 125 can have an affinity score to a standardized job title from the plurality of standardized job titles stored in the standardized database. In some instances, the affinity scores 216 can be determined by the social network system 210 using the offline data processor 240 using the member data 116 and data from the standardization database. The standardization database can store a plurality of standardized job titles.

Techniques for selecting a standardized job title for job postings from the plurality of standardized job titles are described in U.S. patent application Ser. No. 14/523,357, titled "Title Standardization," and U.S. patent application Ser. No. 14/975,633, titled "Title Standardization Ranking Algorithm," which are hereby incorporated by reference in their entirety. For example, the skill determinator 206 can obtain a raw title string for the job title section, and then derive a job title from the raw title string. Additionally, the job title can be derived by calculating a frequency of occurrence of a phrase in the job posting, calculating a conditional probability value indicative of the probability of the phrase being a job title, and designating the phrase as the job title based on its calculated frequency of occurrence and the conditional probability value. Furthermore, the job title for the job posting is selected based on the phrase matching, or being similar to, a standardized job title from the list of job titles.

Additionally, the skills database 120 can include a company affinity score 128 for a job title and a skill. The method 300 can further include the skill determinator 206 determining a company associated with the specific job posting. The company can be the factor determined at operation 410. For example, the company can be listed on the job posting. Additionally, the skill determinator 206 can access, from the skills database 120, a company affinity score 128 for the specific skill and the company. Subsequently, the skill determinator 206 can update the confidence score of the specific skill being associated with the specific job posting based on the accessed company affinity score. In the example described in Equation 1, the company affinity score 128 can be multiplied by $C_1$.

Furthermore, the skills database 120 can include an industry affinity score 129 for a job title and a skill. The method 300 can further include the skill determinator 206 determining an industry associated with the specific job posting. The industry can be the factor determined at operation 410. For example, the industry can be listed on the job posting. In another example, the industry can be determined based on the company associated with the job posting. In yet another example, the industry can be determined based on the standardized job title associated with the job posting. After the industry has been determined, the skill determinator 206 can access, from the skills database 120, an industry affinity score 129 for the specific skill and the industry, and update the confidence score of the specific skill being associated with the specific job posting based on the accessed industry affinity score. In the example described in Equation 1, the industry affinity score 129 can be multiplied by $C_1$.

In some instances, when the skills database 120 stores a company affinity score 128 for the specific skill, the skill determinator 206 can determine, using the extracted textual features, a company associated with the job posting. Additionally, the skill determinator 206 can access, from the skills database 120, the company affinity score 128 for the specific skill based on the determined company. Furthermore, the confidence score calculator 207 can update the confidence score based on the company affinity score 128 for the specific skill.

In some instances, the skills database 120 can store a title affinity score 127 for the specific skill at the determined company. Additionally, the skill determinator 206 can determine, using the extracted textual features, a title at the determined company associated with the job posting. Furthermore, the confidence score calculator 207 can access, from the skills database 120, the title affinity score 127 for the specific skill at the determined company based on the determined title and update the confidence score based on the accessed title affinity score 127.

In some instances, the skills database 120 can store a function affinity score for the specific skill at the determined company. Additionally, the skill determinator 206 can determine, using the extracted textual features, a function at the determined company associated with the job posting. Furthermore, the confidence score calculator 207 can access, from the skills database 120, the function affinity score for the specific skill at the determined company based on the determined function and update the confidence score based on the accessed function affinity score.

In some instances, the skills database 120 can store a title at an industry affinity score for the specific skill Additionally, the skill determinator 206 can determine, using the extracted textual features, an industry associated with the job posting. Moreover, the skill determinator 206 can determine, using the extracted textual features, a title at the determined industry associated with the job posting. Furthermore, the confidence score calculator 207 can access, from the skills database 120, the title at an industry affinity score for the specific skill based on the determined title at the determined industry; and update the confidence score based on the accessed title at an industry affinity score.

FIG. 5 is a flowchart illustrating operations of the social network system 210 in performing method 500 for updating the confidence score using the skill frequency score, according to some example embodiments. Operations in the method 500 may be performed by the network-based system 105, using the skill determinator 206 and confidence score calculator 207 described above with respect to FIG. 2.

In some instances, the confidence score calculated at operation 350 can be updated based on the skill frequency score calculated in method 400.

At operation 510, the confidence score calculator 207 counts the number of instances that the specific skill is included on the profile page of a member having a job title similar to the job posting. The confidence score calculator 207 counts the number of members with a similar job title that possess the specific skill. In some instances, the confidence score calculator 207 counts the number of instances that the specific skill is listed on the profile page of a member having a job title that matches the job title of the job posting. Additionally, the confidence score calculator 207 may count the number of instances that the specific skill is listed on the profile page of a member with a factor (e.g., employed at a specific company, working at a specific industry, having a specific function) that is determined at operation 410 in FIG. 4. A processor in the server machine 110 can count the number of instances.

At operation 520, the confidence score calculator 207 counts the number of instances that the specific skill is included in the job title section of other job postings on the social network system 210, the other job postings being similar to the specific job posting. A processor in the server machine 110 can count the number of instances.

At operation 530, the confidence score calculator 207 counts the number of instances that the specific skill is included in the job description section of other job postings on the social network system 210, the other job postings being similar to the specific job posting. A processor in the server machine 110 can count the number of instances.

At operation 540, the confidence score calculator 207 counts the number of instances that the specific skill is included in the desired skills section of other job postings on the social network system 210, the other job postings being similar to the specific job posting. A processor in the server machine 110 can count the number of instances.

At operation 550, the confidence score calculator 207 calculates the skill frequency score based on the number of instances that the specific skill is listed in a profile page of a member having a similar job title, a job title section of other job postings, a job description section of other job postings, or a desired skills section of other job postings. A processor in the server machine 110 can calculate the skill frequency score. For example, the skill frequency score can be calculated by adding the number of instances counted at operations 510-540. In some instances, the number of instances can have a different weighting factor as shown in Equation 2.

Skill Frequency Score=$C_0$(number of instances skill is listed in a profile page)+$C_1$(number of instances skill is listed job title section)+$C_2$(number of instances skill is listed job description section)+$C_3$(number of instances skill is listed desired skills section), (Equation 2)

where $C_0 \ldots C_3$ are coefficients with a range from 0 to 1.

Figure 6:
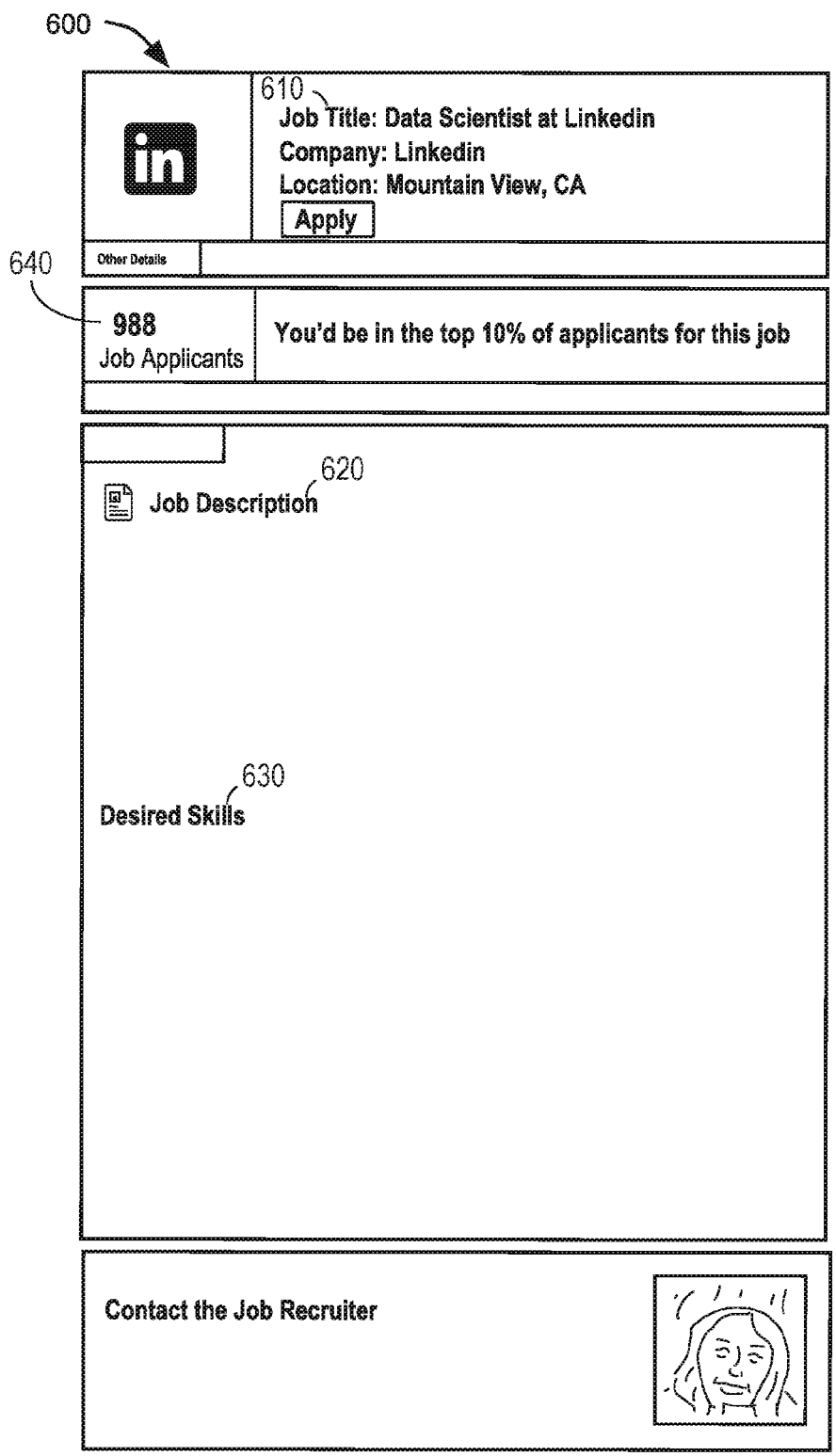
FIG. 6 is a user interface diagram illustrating an example of a job posting, according to some example embodiments.

FIG. 6 is a user interface diagram illustrating an example of a job posting 600, according to some example embodiments. A user interface in FIG. 6 presents a job posting 600 on the social network system 210 having a job title section 610, a job description section 620, and a desired skills section 630. Additionally, the job posting 600 can include a counter number 640 associated with the number of job applicants that have already applied to the job posting 600.

According to various example embodiments, one or more of the methodologies described herein facilitate an association of a skill with a job posting. Additionally, using the database structure illustrated in FIG. 2, the data processing associated with the association may be performed in real time by using the offline data processor 240 for some calculations. For example, the social network system 210 can use the offline data processor 240 in such a way as to allow efficient retrieval and processing of the information in order for the action module 208 to present the specific job posting in real time.

When these effects are considered in aggregate, one or more of the methodologies described herein may obviate a need for certain human efforts or resources that otherwise would be involved in calculating the confidence score. Furthermore, computing resources used by one or more machines, databases, or devices (e.g., within the network environment 100) may similarly be reduced (e.g., by predetermining the affinity score and the skill frequency score). Examples of such computing resources include processor cycles, network traffic, memory usage, data storage capacity, power consumption, and cooling capacity.

Example Machine Architecture and
Machine-Readable Medium

Figure 7:
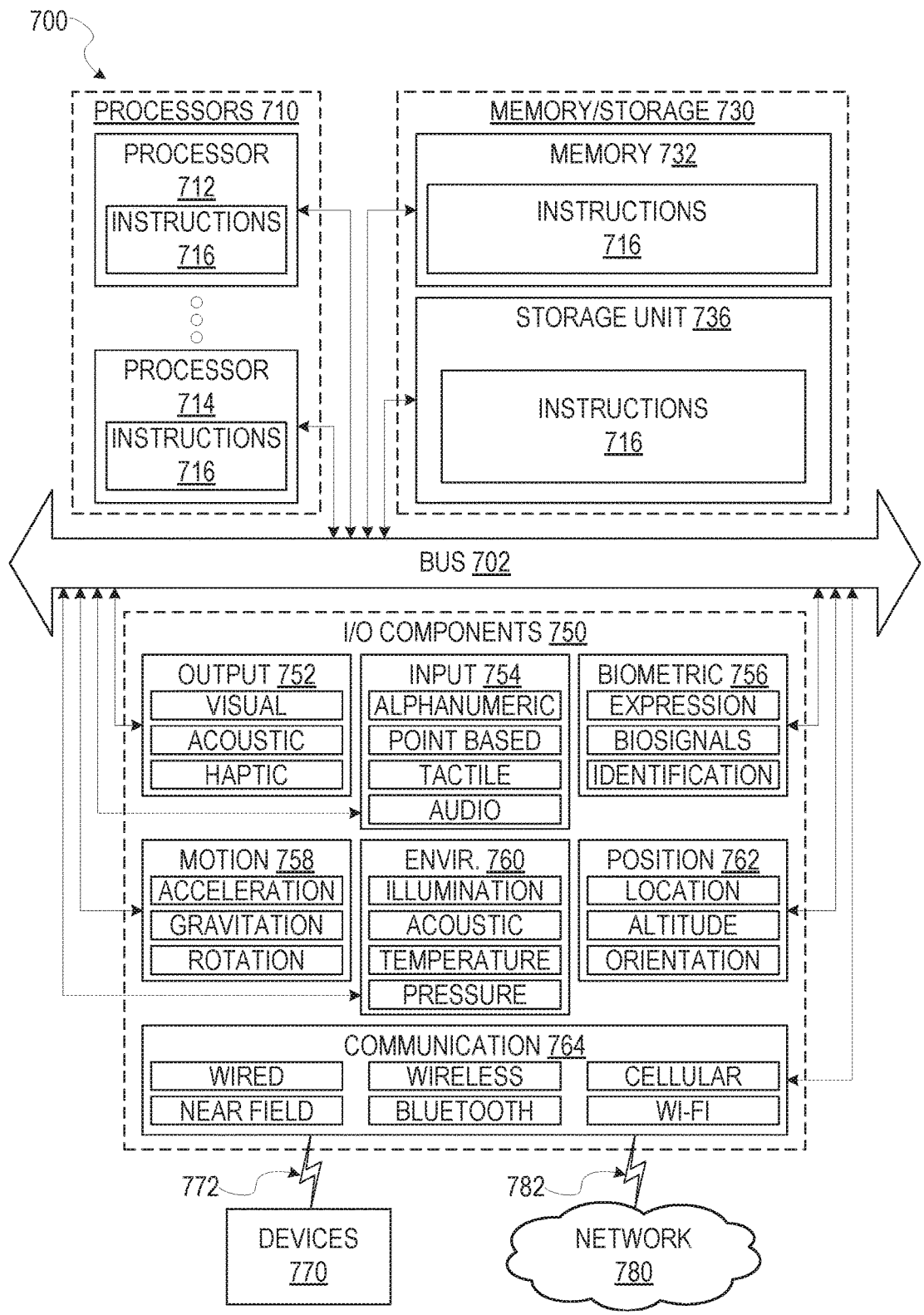
FIG. 7 is a block diagram illustrating components of a machine, according to some example embodiments, able to read instructions from a machine-readable medium and perform any one or more of the methodologies discussed herein.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700, in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the flow diagrams of FIGS. 3 and 4. Additionally, or alternatively, the instructions 716 may implement the processes performed by the skill determinator 206, confidence score calculator 207, and action module 208 of FIG. 2, and so forth. The instructions 716 transform the general, non-programmed machine 700 into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory/storage 730, and I/O components 750, which may be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 712 and a processor 714 that may execute the instructions 716. The term "processor" is intended to include a multi-core processor that may comprise two or more independent processors (sometimes referred to as "cores") that may execute instructions 716 contemporaneously. Although FIG. 7 shows multiple processors 710, the machine 700 may include a single processor with a single core, a single processor with multiple cores (e.g., a multi-core processor), multiple processors with a single core, multiple processors with multiples cores, or any combination thereof. For example, the operations described in the method 300, the method 400, and the method 500 can be performed by one or more of the processors 710.

The memory/storage 730 may include a memory 732, such as a main memory, or other memory storage, and a storage unit 736, both accessible to the processors 710 such as via the bus 702. The storage unit 736 and memory 732 store the instructions 716 embodying any one or more of the methodologies or functions described herein. The instructions 716 may also reside, completely or partially, within the memory 732, within the storage unit 736, within at least one of the processors 710 (e.g., within the processor's cache memory), or any suitable combination thereof, during execution thereof by the machine 700. Accordingly, the memory 732, the storage unit 736, and the memory of the processors 710 are examples of machine-readable media. The memory/storage 730 can store the indicators 114, member data 116, the data stored in the jobs database 117, and the data stored in the skills database 120.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or other suitable device to interface with the network 780. In further examples, the communication components 764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a Universal Serial Bus (USB)).

Moreover, the communication components 764 may detect identifiers or include components operable to detect identifiers. For example, the communication components 764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 780 may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a POTS network, a cellular telephone network, a wireless network, a Wi-Fi® network, another type of network, or a combination of two or more such networks. For example, the network 780 or a portion of the network 780 may include a wireless or cellular network and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Certain embodiments are described herein as including logic or a number of components, modules, or mechanisms. Modules may constitute software modules code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
a jobs database storing a plurality of job postings, a job posting in the plurality of job postings having a number of submitted job applications;
a member database storing profile data of a plurality of members in a social network system, the profile data of a member in the plurality of members having skills listed on a profile page of the member and an indicator that the member has applied to a job posting in the plurality of job postings;
one or more processors configured to:
 select, from the jobs database, a specific job posting from the plurality of job postings, the number of submitted job applications for the specific job posting being above a predetermined threshold;
 determine, using indicators in the profile data of the plurality of members, job applicants that have applied to the specific job posting;
 obtain, using profile data of the job applicants, a set of skills associated with the job applicants;
 determine, using the profile data of the job applicants, a percentage of the job applicants having a specific skill from the set of skills;
 calculate a confidence score of the specific skill being associated with the specific job posting based on the percentage of the job applicants having the specific skill; and
 select a first member from the plurality of members based on the first member having an indicator that the first member has not previously applied to the specific job posting; and
a user interface causing a presentation of the specific job posting to the first member when the confidence score transgresses a predetermined score, the specific skill being listed on a profile page of the first member.

2. The system of claim 1, wherein the one or more processors are further configured to rank each skill in the set of skills based on a confidence score for each skill in the set of skills.

3. The system of claim 2, wherein the one or more processors are further configured to select the first member from the plurality of members based on a predetermined number of top skills being listed on the profile page of the first member.

4. The system of claim 3, wherein the top skills include three highest ranking skills from the set of skills.

5. The system of claim 1, wherein the social networking service includes a job hosting service, and the specific job posting is posted on the job hosting service.

6. The system of claim 1 further comprising a skills database storing an association between a skill and a job posting, wherein the one or more processors are further configured to:
store, in the skills database, an association of the specific skill with the specific job posting when the confidence score transgresses the predetermined score.

7. The system of claim 6, wherein the skills database includes a title affinity score for a job title and a skill, and wherein the one or more processors are further configured to:
determine a specific job title associated with the specific job posting;
access, from the skills database, a title affinity score for the specific skill and the specific job title; and
update the confidence score of the specific skill being associated with the specific job posting based on the accessed title affinity score.

8. The system of claim 6, wherein the skills database includes a company affinity score for a job title and a skill, wherein the one or more processors are further configured to:
determine a company associated with the specific job posting;
access, from the skills database, a company affinity score for the specific skill and the company; and
update the confidence score of the specific skill being associated with the specific job posting based on the accessed company affinity score.

9. The system of claim 6, wherein the skills database includes an industry affinity score for a job title and a skill, wherein the one or more processors are further configured to:
determine an industry associated with the specific job posting;
access, from the skills database, an industry affinity score for the specific skill and the industry; and
update the confidence score of the specific skill being associated with the specific job posting based on the accessed industry affinity score.

10. The system of claim 6, wherein the one or more processors are further configured to:
determine that the specific skill is mentioned in a job title section of the specific job posting;
access, from the skills database, a job title coefficient for the specific skill when it is determined that the specific skill is mentioned in the job title section; and
increase the confidence score of the specific skill being associated with the specific job posting based on the job title coefficient.

11. The system of claim 6, wherein the one or more processors are further configured to:

determine that the specific skill is mentioned in a job description section of the specific job posting;

access, from the skills database, a job description coefficient for the specific skill when it is determined that the specific skill is mentioned in the job description section; and increase the confidence score of the specific skill being associated with the specific job posting based on the job description coefficient.

12. The system of claim 11, wherein the confidence score is further increased based on a number of instances the specific skill is explicitly mentioned in the job description section.

13. The system of claim 6, wherein the one or more processors are further configured to:

determine that the specific skill is mentioned in a desired skills section of the specific job posting;

access, from the skills database, a desired skill coefficient for the specific skill when it is determined that the specific skill is mentioned in the desired skills section; and increase the confidence score of the specific skill being associated with the specific job posting based on the desired skill coefficient.

14. The system of claim 1, wherein the one or more processors are further configured to:

determine a job title for the specific job posting;

determine, using the profile data of the plurality of members, a skill frequency score associated with the specific skill and the determined job title, the skill frequency score being based on the specific skill being listed on a profile page of one or more members in the plurality of members that are associated with the determined job title; and update the confidence score of the specific skill being associated with the specific job posting based on the skill frequency score.

15. The system of claim 1, further comprising:

a user interface to present, on a display of a device of a recruiter associated with the specific job posting, a profile of a member having the specific skill when the confidence score transgresses the predetermined threshold.

16. A method comprising:

selecting, from a jobs database, a specific job posting from a plurality of job postings, a number of submitted job applications for the specific job posting being above a predetermined threshold;

determining, using profile data of a plurality of members of a social network system, job applicants that have applied to the specific job posting, profile data of the job applicants having an indicator of having applied to the specific job posting;

obtaining, using the profile data of the job applicants, a set of skills associated with the job applicants;

determining, using the profile data of the job applicants, a percentage of the job applicants having a specific skill from the set of skills;

calculating, using a processor, a confidence score of the specific skill being associated with the specific job posting based on the percentage of the job applicants having the specific skill;

selecting a first member from the plurality of members based on the first member having an indicator that the first member has not previously applied to the specific job posting; and causing a presentation of the specific job posting to the first member when the confidence score transgresses a predetermined score, the specific skill being listed on a profile page of the first member.

17. The method of claim 16, further comprising:

ranking each skill in the set of skills based on a confidence score for each skill in the set of skills; and selecting the first member from the plurality of members based on a predetermined number of top skills being listed on the profile page of the first member, wherein the top skills include three highest ranking skills from the set of skills.

18. The method of claim 16, further comprising:

determining a job title associated with the specific job posting;

accessing, from a skills database, a title affinity score for the specific skill and the job title; and updating the confidence score of the specific skill being associated with the specific job posting based on the accessed title affinity score.

19. A non-transitory machine-readable storage medium comprising instructions that, when executed by one or more processors of a machine, cause the machine to:

select, from a jobs database, a specific job posting from a plurality of job postings, a number of submitted job applications for the specific job posting being above a predetermined threshold;

determine, using profile data of a plurality of members, job applicants that have applied to the specific job posting, profile data of the job applicants having an indicator of having applied to the specific job posting;

obtain, using the profile data of the job applicants, a set of skills associated with the job applicants;

determine, using the profile data of the job applicants; a percentage of the job applicants having a specific skill from the set of skills;

calculate a confidence score of the specific skill being associated with the specific job posting based on the percentage of the job applicants having the specific skill;

select a first member from the plurality of members based on the first member having an indicator that the first member has not previously applied to the specific job posting; and cause a presentation of the specific job posting to the first member when the confidence score transgresses a predetermined score, the specific skill being listed on a profile page of the first member.

* * * * *

UNITED STATES PATENT AND TRADEMARK OFFICE
CERTIFICATE OF CORRECTION

PATENT NO. : 10,380,552 B2
APPLICATION NO. : 15/404846
DATED : August 13, 2019
INVENTOR(S) : Zhang et al.

It is certified that error appears in the above-identified patent and that said Letters Patent is hereby corrected as shown below:

On the Title Page

On page 4, in Column 1, item [56], under "Other Publications", Line 16, delete "Bried" and insert --Brief-- therefor On page 4, in Column 2, item [56], under "Other Publications", Line 14, delete "datted" and insert --dated-- therefor In the Claims Column 28, Line 43, Claim 19, delete "applicants;" and insert --applicants,-- therefor Signed and Sealed this
Twenty-seventh Day of October, 2020

Andrei Iancu
*Director of the United States Patent and Trademark Office*